US011971876B2

(12) United States Patent
Carru et al.

(10) Patent No.: US 11,971,876 B2
(45) Date of Patent: Apr. 30, 2024

(54) OBJECT RESOLUTION AMONG ACCOUNT-LEVEL NAMESPACES FOR DATABASE PLATFORMS

(71) Applicant: Snowflake Inc., Bozeman, MT (US)

(72) Inventors: Damien Carru, New York, NY (US); Thierry Cruanes, San Mateo, CA (US); Istvan Cseri, Seattle, WA (US); Benoit Dageville, San Mateo, CA (US); Zheng Mi, Palo Alto, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/647,915

(22) Filed: Jan. 13, 2022

(65) Prior Publication Data
US 2022/0138184 A1    May 5, 2022

Related U.S. Application Data

(63) Continuation of application No. 16/945,344, filed on Jul. 31, 2020, now Pat. No. 11,249,988, which is a
(Continued)

(51) Int. Cl.
*G06F 16/23*    (2019.01)
*G06F 16/27*    (2019.01)
(Continued)

(52) U.S. Cl.
CPC .......... *G06F 16/2379* (2019.01); *G06F 16/27* (2019.01); *G06F 16/9535* (2019.01); *G06Q 30/01* (2013.01)

(58) Field of Classification Search
CPC .. G06F 16/2379; G06F 16/27; G06F 16/9535; G06Q 30/01
See application file for complete search history.

(56) References Cited

U.S. PATENT DOCUMENTS 6,209,036 B1    3/2001    Aldred et al.
6,560,618 B1    5/2003    Ims
(Continued)

FOREIGN PATENT DOCUMENTS

CN            113704247 A    11/2021
WO    WO-2022/026973 A1    2/2022

OTHER PUBLICATIONS

What is a package, Oracle; captured in wayback.pdf (Year: 2013).*
(Continued)

*Primary Examiner* — Richard A McCoy
(74) *Attorney, Agent, or Firm* — Schwegman Lundberg & Woessner, P.A.

(57) ABSTRACT

A database platform receives an object identifier from a client in association with a database session. The client is associated with a customer account of the database platform, and the database session is associated with the client. The customer account includes multiple disjoint account-level namespaces, each of which represents a distinct context for resolution of object identifiers, such that matching object identifiers in different account-level namespaces in the customer account do not collide with respect to object-identifier resolution. The database platform determines that the object identifier does not specify an account-level namespace, and responsively resolves the object identifier with reference to a current account-level namespace of the database session by identifying an object corresponding to the object identifier in the customer account.

23 Claims, 7 Drawing Sheets

Related U.S. Application Data continuation-in-part of application No. 16/883,565, filed on May 26, 2020.

(60) Provisional application No. 63/027,625, filed on May 20, 2020.

(51) Int. Cl.
  *G06F 16/9535* (2019.01)
  *G06Q 30/01* (2023.01)

(56) References Cited

U.S. PATENT DOCUMENTS

| | | | |
|---|---|---|---|
| 7,047,485 | B1 | 5/2006 | Klein et al. |
| 10,346,373 | B1 | 7/2019 | Kulshreshtha |
| 11,249,988 | B2 | 2/2022 | Carru et al. |
| 11,501,010 | B2 | 11/2022 | Acharya et al. |
| 11,593,354 | B2 | 2/2023 | Carru et al. |
| 2001/0038624 | A1 | 11/2001 | Greenberg et al. |
| 2002/0128931 | A1 | 9/2002 | Himmel et al. |
| 2003/0036919 | A1 | 2/2003 | Felt et al. |
| 2004/0055005 | A1 | 3/2004 | Creswell et al. |
| 2005/0091311 | A1 | 4/2005 | Lund et al. |
| 2005/0091402 | A1 | 4/2005 | Satagopan et al. |
| 2005/0091658 | A1 | 4/2005 | Kavalam et al. |
| 2006/0053334 | A1 | 3/2006 | Ingen et al. |
| 2006/0092938 | A1 | 5/2006 | Gentrix |
| 2007/0000995 | A1 | 1/2007 | Sachdeva et al. |
| 2007/0240134 | A1 | 10/2007 | Buragohain et al. |
| 2008/0104212 | A1* | 5/2008 | Ebrom .................... G06Q 10/06 714/E11.202 |
| 2008/0120689 | A1 | 5/2008 | Morris et al. |
| 2009/0007162 | A1* | 1/2009 | Sheehan .................. G06F 16/24 719/331 |
| 2010/0146584 | A1 | 6/2010 | Haswarey et al. |
| 2011/0106770 | A1 | 5/2011 | Mcdonald et al. |
| 2011/0106802 | A1 | 5/2011 | Pinkney et al. |
| 2011/0161988 | A1 | 6/2011 | Kashyap |
| 2012/0011512 | A1 | 1/2012 | Peckham et al. |
| 2012/0110330 | A1 | 5/2012 | Dickgiesser et al. |
| 2012/0278334 | A1 | 11/2012 | Abjanic |
| 2013/0018890 | A1 | 1/2013 | Rajan et al. |
| 2013/0159349 | A1* | 6/2013 | Plantenberg ............ G06F 16/25 707/782 |
| 2016/0313934 | A1 | 10/2016 | Isherwood et al. |
| 2016/0373327 | A1 | 12/2016 | Degioanni et al. |
| 2017/0039242 | A1* | 2/2017 | Milton .................... H04W 4/02 |
| 2017/0041288 | A1 | 2/2017 | Stotski et al. |
| 2017/0123935 | A1* | 5/2017 | Pandit .................. G06F 16/2219 |
| 2017/0339158 | A1 | 11/2017 | Lewis et al. |
| 2018/0041491 | A1 | 2/2018 | Gupta et al. |
| 2018/0314957 | A1 | 11/2018 | Kang et al. |
| 2019/0121543 | A1 | 4/2019 | Frolikov |
| 2019/0303175 | A1 | 10/2019 | Irani et al. |
| 2020/0042330 | A1 | 2/2020 | Lipke et al. |
| 2020/0125652 | A1 | 4/2020 | Shilimkar et al. |
| 2020/0192592 | A1 | 6/2020 | Song et al. |
| 2020/0278933 | A1 | 9/2020 | Frolikov |
| 2020/0382442 | A1 | 12/2020 | Bantke et al. |
| 2021/0365437 | A1 | 11/2021 | Carru et al. |
| 2021/0365438 | A1 | 11/2021 | Carru et al. |
| 2021/0365577 | A1 | 11/2021 | Acharya et al. |

OTHER PUBLICATIONS

"Indian Application Serial No. 202144018870, First Examination Report dated Feb. 15, 2022", 6 pgs.
"U.S. Appl. No. 16/883,565, Non Final Office Action dated Feb. 17, 2022", 19 pgs.
"U.S. Appl. No. 16/945,546, Response filed Feb. 18, 2022 to Non Final Office Action dated Oct. 18, 2021", 12 pgs.
"U.S. Appl. No. 16/945,546, Notice of Allowance dated Mar. 15, 2022", 10 pgs.
"U.S. Appl. No. 16/883,565, Response filed May 17, 2022 to Non Final Office Action dated Feb. 17, 2022", 14 pgs.
"U.S. Appl. No. 16/945,546, Notice of Allowance dated Jun. 23, 2022", 10 pgs.
Anoshin, D, et al., "Snowflake Administration", In: Jumpstart Snowflake. Apress, Berkeley, CA, <https://doi.org/10.1007/978-1-4842-5328-1_7> (2020), 23 pgs.
Howell, Jon, et al., "Snowflake: Spanning administrative domains", (1998), 10 pgs.
"U.S. Appl. No. 16/883,565, Notice of Allowance dated Jun. 30, 2022", 15 pgs.
"U.S. Appl. No. 16/883,565, Advisory Action dated Mar. 15, 2021", 3 pgs.
"U.S. Appl. No. 16/883,565, Examiner Interview Summary dated Apr. 26, 2021", 2 pgs.
"U.S. Appl. No. 16/883,565, Examiner Interview Summary dated Jul. 21, 2021", 2 pgs.
"U.S. Appl. No. 16/883,565, Examiner Interview Summary dated Nov. 9, 2021", 3 pgs.
"U.S. Appl. No. 16/883,565, Final Office Action dated Jan. 6, 2021", 13 pgs.
"U.S. Appl. No. 16/883,565, Final Office Action dated Aug. 30, 2021", 19 pgs.
"U.S. Appl. No. 16/883,565, Non-Final Office Action dated Apr. 23, 2021", 13 pgs.
"U.S. Appl. No. 16/883,565, Non-Final Office Action dated Sep. 17, 2020", 10 pgs.
"U.S. Appl. No. 16/883,565, Response filed Mar. 8, 2021 to Final Office Action dated Jan. 6, 2021", 11 pgs.
"U.S. Appl. No. 16/883,565, Response filed Jul. 23, 2021 to Non-Final Office Action dated Apr. 23, 2021", 14 pgs.
"U.S. Appl. No. 16/883,565, Response filed Nov. 9, 2021 to Final Office Action dated Aug. 30, 2021", 17 pgs.
"U.S. Appl. No. 16/883,565, Response filed Dec. 17, 2020 to Non-Final Office Action dated Sep. 17, 2020", 13 pgs.
"U.S. Appl. No. 16/945,344, Examiner Interview Summary dated Mar. 19, 2021", 3 pgs.
"U.S. Appl. No. 16/945,344, Examiner Interview Summary dated Oct. 1, 2021", 3 pgs.
"U.S. Appl. No. 16/945,344, Examiner Interview Summary dated Dec. 7, 2020", 2 pgs.
"U.S. Appl. No. 16/945,344, Final Office Action dated Dec. 21, 2020", 36 pgs.
"U.S. Appl. No. 16/945,344, Non-Final Office Action dated Jun. 29, 2021", 40 pgs.
"U.S. Appl. No. 16/945,344, Non-Final Office Action dated Sep. 10, 2020", 33 pgs.
"U.S. Appl. No. 16/945,344, Notice of Allowance dated Oct. 15, 2021", 8 pgs.
"U.S. Appl. No. 16/945,344, Notice of Allowance dated Dec. 15, 2021", 8 pgs.
"U.S. Appl. No. 16/945,344, Response filed Mar. 22, 2021 to Final Office Action dated Dec. 21, 2020", 15 pgs.
"U.S. Appl. No. 16/945,344, Response filed Sep. 29, 2021 to Non-Final Office Action dated Jun. 29, 2021", 15 pgs.
"U.S. Appl. No. 16/945,344, Response filed Dec. 9, 2020 to Non-Final Office Action dated Sep. 10, 2020", 16 pgs.
"U.S. Appl. No. 16/945,344, Supplemental Notice of Allowability dated Dec. 27, 2021", 5 pgs.
"U.S. Appl. No. 16/945,546, Advisory Action dated Jun. 28, 2021", 3 pgs.
"U.S. Appl. No. 16/945,546, Examiner Interview Summary dated Feb. 2, 2022", 3 pgs.
"U.S. Appl. No. 16/945,546, Examiner Interview Summary dated Apr. 8, 2021", 3 pgs.
"U.S. Appl. No. 16/945,546, Examiner Interview Summary dated Jul. 15, 2021", 3 pgs.
"U.S. Appl. No. 16/945,546, Final Office Action dated Apr. 15, 2021", 21 pgs.
"U.S. Appl. No. 16/945,546, Non-Final Office Action dated Jan. 6, 2021", 19 pgs.
"U.S. Appl. No. 16/945,546, Non-Final Office Action dated Oct. 18, 2021", 22 pgs.

(56) References Cited

OTHER PUBLICATIONS

"U.S. Appl. No. 16/945,546, Response filed Apr. 6, 2021 to Non-Final Office Action dated Jan. 6, 2021", 12 pgs.

"U.S. Appl. No. 16/945,546, Response filed Jun. 15, 2021 to Final Office Action dated Apr. 15, 2021", 11 pgs.

"U.S. Appl. No. 16/945,546, Response filed Jul. 15, 2021 to Advisory Action dated Jun. 28, 2021", 8 pgs.

"International Application Serial No. PCT/US2021/070798, International Search Report dated Aug. 30, 2021", 2 pgs.

"International Application Serial No. PCT/US2021/070798, Written Opinion dated Aug. 30, 2021", 10 pgs.

Xia, Luning, et al., "An Administrative Model for Role-Based Access Control Using Hierarchical Namespace", *Journal of Computer Research and Development*, 44(12): 30, (Jan. 2006), 181-188.

Zuo, Qiong, et al., "Autonomous decentralized tenant access control model for sub-tenancy architecture in software-as-a-service (SaaS)", *IEEE Twelfth International Symposium on Autonomous Decentralized Systems*, (2015), 211-216.

Zuo, Qiong, et al., "Tenant-based access control model for multi-tenancy and sub-tenancy architecture in Software-as-a-Service", *Frontiers of Computer Science* 11(3), (2017), 465-484.

"U.S. Appl. No. 16/883,565, 312 Amendment Filed Sep. 28, 2022", 11 pgs.

"U.S. Appl. No. 16/883,565, PTO Response to Rule 312 Communication dated Jan. 7, 2022", 2 pgs.

"U.S. Appl. No. 16/945,546, Notice of Allowance dated Nov. 2, 2022", 9 pgs.

"Indian Application Serial No. 202144018870, Response filed Jul. 28, 2022 to First Examination Report dated Feb. 15, 2022", 35 pgs.

"International Application Serial No. PCT/US2021/070798, International Preliminary Report on Patentability dated Feb. 9, 2023", 12 pgs.

U.S. Appl. No. 16/883,565, filed May 26, 2020, Application-Provisioning Framework for Database Platforms.

U.S. Appl. No. 16/945,344 U.S. Pat. No. 11,249,988, Jul. 31, 2020, Account-Level Namespaces for Database Platforms.

U.S. Appl. No. 16/945,546, filed Jul. 31, 2020, Namespace-Based System-User Access of Database Platforms.

* cited by examiner

OBJECT RESOLUTION AMONG ACCOUNT-LEVEL NAMESPACES FOR DATABASE PLATFORMS

CROSS-REFERENCE TO RELATED APPLICATIONS

This application is a Continuation of U.S. patent application Ser. No. 16/945,344, filed Jul. 31, 2020 and entitled "Account-Level Namespaces for Database Platforms," which is a continuation-in-part of U.S. patent application Ser. No. 16/883,565, filed May 26, 2020 and entitled "Application-Provisioning Framework for Database Platforms," which claims the benefit of U.S. Provisional Patent Application No. 63/027,625, filed May 20, 2020 and entitled "Application-Provisioning Framework for Database Platforms," all of which are hereby incorporated by reference herein in their respective entireties.

TECHNICAL FIELD

The present disclosure relates to databases and database platforms. In some aspects, this disclosure relates to account-level namespaces for database platforms. In other aspects, this disclosure relates to namespace-based system-user access of database platforms.

BACKGROUND

Database platforms are widely used for data storage and data access in computing and communication contexts. With respect to architecture, a database platform could be an on-premises database platform, a network-based database platform (e.g., a cloud-based database platform), a combination of the two, and/or include another type of architecture. With respect to type of data processing, a database platform could implement online transactional processing (OLTP), online analytical processing (OLAP), a combination of the two, and/or another type of data processing. Moreover, a database platform could be or include a relational database management system (RDBMS) and/or one or more other types of database management systems.

In a typical implementation, a database platform includes one or more databases that are maintained on behalf of a customer account. Indeed, a database platform may include one or more databases that are respectively maintained in association with any number of customer accounts, as well as one or more databases that are associated with one or more system (e.g., administrative) accounts of the database platform, one or more other databases that are used for administrative purposes, and/or one or more other databases that are maintained in association with one or more other organizations and/or for any other purposes. A database platform may store metadata in association with the database platform in general and in association with particular databases and/or particular customer accounts as well. Metadata that is maintained by a database platform with respect to stored data (e.g., stored customer data) may be referred to herein at times as "expression properties."

Users and/or executing processes (that may be associated with, e.g., a customer account) may, via one or more types of clients, be able to cause data to be ingested into one or more databases in the database platform, and may also be able to manipulate the data, run queries against the data, create materialized views (also referred to herein simply as "views") of the data, modify the data, insert additional data, remove data, and/or the like. Example types of clients include web interfaces, Java Database Connectivity (JDBC) drivers, Open Database Connectivity (ODBC) drivers, other types of drivers, desktop applications, mobile apps, and/or the like. A database platform may physically store database data in multiple storage units, which may be referred to as blocks, micro-partitions, files, and/or by one or more other names. In the present disclosure, the physical units of data that are stored by a database platform—and that make up the content of, e.g., tables in customer accounts—are referred to as micro-partitions. A given table may be organized as records (e.g., rows) that each include one or more attributes (e.g., columns). In various different implementations, a database platform may store metadata in micro-partitions as well.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Introduction

Figure 1:
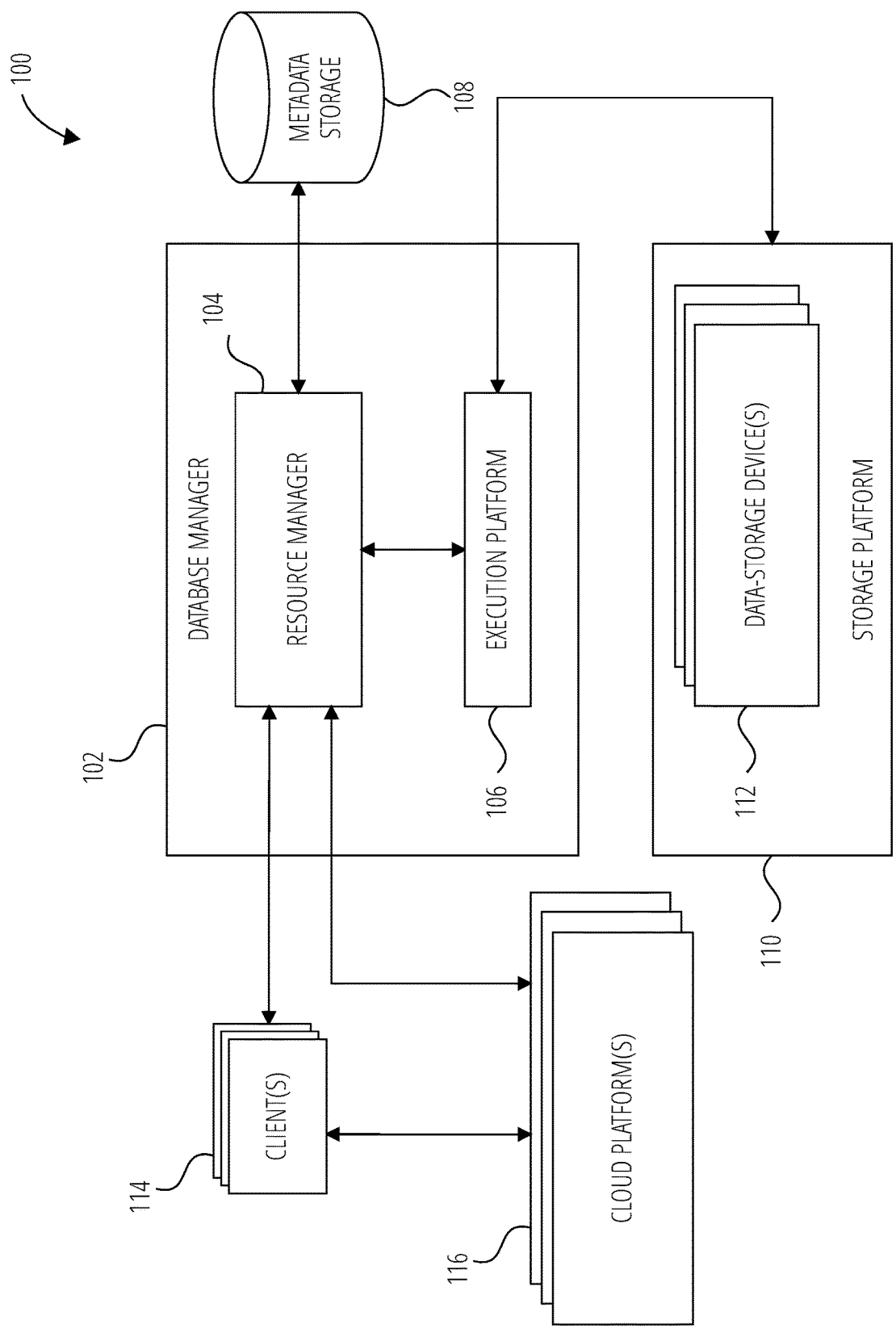
FIG. 1 illustrates an example database platform, in accordance with at least one embodiment.

In an implementation of a database platform, a database may be represented as an account-level object "within" (e.g., associated with) a customer account, and the customer account may also include one or more other account-level objects such as user objects, role objects, and/or the like. In the present disclosure, a user object may be referred to simply as a user, a role object may be referred to simply as a role, and so forth. Additional examples of account-level objects are discussed below. An account-level object such as a database may contain one or more other objects such as tables, schemas, views, streams, tasks, and/or the like. In some embodiments, databases contain schemas, and schemas in turn contain objects such as tables, views, streams, tasks, etc. As used herein, an "account-level object" is an object that is "inside" a customer account but is not inside another object in the customer account.

Disclosed herein are various embodiments of systems and methods for implementing account-level namespaces in database platforms, as well as various embodiments of systems and methods for implementing namespace-based system-user access of database platforms. In embodiments of the present disclosure, a new account-level object—a namespace (also referred to herein as an "account-level namespace")—is introduced into customer accounts (and, in some cases, other accounts such as administrative accounts, though customer accounts are the example type of account that is primarily described herein). In some embodiments, namespaces (also referred to herein at times as namespace objects) are implemented as "parent" objects to the one or more other "child" objects (e.g., users, roles, sub-namespaces, etc.) that are inside a given namespace, such that those particular other objects are not account-level objects (though other users, roles, and/or the like still could be). In other embodiments, the one or more objects that are inside of a given namespace are still account-level objects alongside the namespace with which they are associated, and of which they are still considered to be inside.

In some embodiments of the present disclosure, account-level namespaces are used to guide name resolution of objects in a given customer account. One example embodiment takes the form of a method that includes a database platform receiving an object identifier (e.g., an object name) from a client in association with a database session, where the client is associated with a customer account of the database platform, and where the database session is associated with the client. The method also includes the database platform, in response to receiving the object identifier, identifying a resolution namespace for the object identifier, where the resolution namespace for the object identifier is a namespace that is specified in the object identifier if the object identifier includes a specified namespace, and where the resolution namespace is otherwise a current account-level namespace of the database session. The method also includes the database platform resolving the object identifier (e.g., the object name) with reference to the identified resolution namespace for the object identifier, where resolving the object identifier includes identifying an object (e.g., a database) corresponding to the object identifier in the customer account. Thus, it is noted that, in some implementations, as described more fully below, a namespace can be encoded as part of an object identifier, in which case that specified namespace is used for resolving the object identifier, regardless of whether or not that specified namespace is the current account-level namespace of the database session.

The creation and use of account-level namespaces in accordance with embodiments of the present disclosure prevents name collisions that would otherwise occur if an object (e.g., a database) was created (or attempted to be created) with a particular name in a customer account in which an object (e.g., an object of the same type (i.e., another database)) having that particular name already existed. The prevention of name collisions with respect to account-level objects relieves developers of the burden of reviewing existing object names each time they want to name a new object, and also relieves them of the inconvenience and frustration of encountering errors when name collisions occur. Moreover, by virtue of the account-level namespaces of the present disclosure, the naming of objects is also simplified in that complex, convoluted, account-wide naming conventions for objects are rendered unnecessary.

Furthermore, the account-level namespaces of the present disclosure provide simplified control for developers and administrators with respect to the visibility of and access to sets of objects. In a rules-based access control (RBAC) model, various privileges can be created that relate to visibility, access, permitted operations, and/or the like for particular account-level namespaces (and therefore for the objects therein). Those privileges can be selectively assigned to roles, and those roles can be selectively assigned to one or more users (including user objects associated with human users and user objects associated with system users, as discussed more fully below).

Additionally, the implementation of account-level namespaces in accordance with embodiments of the present disclosure simplifies replication of sets of objects within a given customer account and/or across multiple customer accounts. In some existing database-platform implementations, after a database has been manually replicated from one customer account to another, one or more (and often numerous) other account-level objects such as users, roles, and/or the like must then also be manually replicated into the second customer account. This process is time-consuming and susceptible to human error. In accordance with at least one embodiment, however, a first namespace may contain one or more objects such as databases, users, roles, etc., and that first namespace (and the one or more objects contained therein) can be conveniently replicated to, e.g., another customer account in a single operation (or small number of operations). Replication of account-level namespaces in accordance with at least one embodiment of the present disclosure saves time and processing resources as compared with the manual processes of prior implementations.

Moreover, in some embodiments, account-level namespaces in accordance with embodiments of the present disclosure enable customers of a database platform to better serve their own customers. For example, a customer of the database platform can create a namespace within their own account on the database platform for each of multiple "sub-customers" (i.e., customers of the customer of the database platform). This type of implementation of a so-called "multi-tenant" installation makes tasks such as management, billing, and the like less burdensome on the customer of the database platform. Other advantages of account-level namespaces in accordance with embodiments of the present disclosure are described herein and will be apparent to those of skill in the art having the benefit of the present disclosure.

The above-mentioned namespace-based system-user access of database platforms represents one of many possible types of implementations that are enabled by the present disclosure. One example embodiment takes the form of a method that includes a database platform authenticating a system user for access via an application to a database associated with a customer account of the database platform, where the system user is a user object that is defined in a namespace of the customer account. In at least one embodiment, the first namespace is distinct from a default namespace of the customer account. The method also includes the database platform sending, by the system user and via the application, a query to the database that is associated in the database platform with the customer account. The method also includes the database platform receiving, as the system user, results of the query from the database, and further includes the database platform storing, as the system user, the results of the query in a first-namespace stage, which is also defined as an object in the first namespace. A number of variations of this example embodiment are described herein.

As described above, one or more embodiments of the present disclosure take the form of methods that include multiple operations. One or more other embodiments take the form of systems (e.g., database platforms) that include at least one hardware processor and that also include one or more computer-storage media containing instructions executable by the at least one hardware processor for causing the at least one hardware processor to perform multiple operations (that may or may not correspond to operations performed in a herein-disclosed method embodiment). Still one or more other embodiments take the form of one or more computer-storage media containing instructions executable by at least one hardware processor (of, e.g., a database platform) for causing the at least one hardware processor to perform multiple operations (that, again, may or may not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a database-platform embodiment), a computer-storage-medium (or computer-storage-media) embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

Example Database Platform

FIG. 1 illustrates an example database platform 100, in accordance with at least one embodiment. In various embodiments, the database platform 100 may be used for performing one or more of the operations (e.g., one or more of the methods) that are disclosed herein. As shown in FIG. 1, the database platform 100 includes a database manager 102, which includes a resource manager 104 and an execution platform 106. The database manager 102 need not be a defined physical device, though it could be, but in general is used herein as shorthand to refer to the combination of the resource manager 104 and the execution platform 106. The execution platform 106 may include one or more execution nodes (e.g., servers, workers, threads, and/or the like). A grouping of execution nodes in the execution platform 106 may be referred to herein as a virtual warehouse (or just "warehouse" for short), and such virtual warehouses are, in some embodiments, dynamically scalable to meet dynamically changing demands. Also depicted in FIG. 1 are a metadata storage 108, a storage platform 110 that includes one or more data-storage devices 112, one or more clients 114, and one or more cloud platforms 116. In various different implementations, there could be any number of any of the entities that are shown in FIG. 1.

In some embodiments, all of the entities—other than the one or more cloud platforms 116—that are depicted in FIG. 1 are part of what is referred to herein as the database platform 100, though this is not the case in other embodiments. For example, in at least one embodiment, the database platform 100 does not include any of the one or more clients 114. As another example, in some embodiments, the database platform 100 does not include the storage platform 110. In the embodiments that are primarily described herein to illustrate various examples, the database platform 100 includes the database manager 102 (including the resource manager 104 and the execution platform 106), the metadata storage 108, and the storage platform 110, and does not include any of the one or more clients 114 or any of the one or more cloud platforms 116. It is further noted that the storage platform 110 could be implemented in whole or in part on a cloud platform and still be considered part of the database platform 100.

The resource manager 104 may be configured to manage a number of different types of tasks including external database tasks (e.g., query requests) that are received from, e.g., a client 114. The resource manager 104 may be coupled to any number of clients 114. A client 114 may facilitate end users making data-storage and/or data-retrieval requests, system administrators managing the database platform 100, and/or the like. In various different embodiments, a client 114 could be a web interface, a JDBC driver, an ODBC driver, a desktop application, a mobile app, and/or another type of client. As shown in FIG. 1, a client 114 may communicate with the database platform 100 (e.g., the resource manager 104 of the database manager 102) and one or more of the cloud platforms 116. A client 114 could reside on a client-side computing device (not pictured) on which the client 114 interacts with one or more client-side applications and on which the client 114 makes use of certain client-side-system resources such as network interfaces, user interfaces, memory (e.g., random access memory (RAM)), and/or the like.

As depicted in FIG. 1, the resource manager 104 is communicatively coupled to the metadata storage 108, which in at least one embodiment is associated with data stored throughout the database platform 100, and may also reflect data stored on one or more of the cloud platforms 116. Indeed, in some embodiments, the metadata storage 108 includes one or more summaries of data available in one or more local caches (of, e.g., the resource manager 104 and/or the execution platform 106), data stored in the storage platform 110, and/or data stored in one or more of the cloud platforms 116. Additionally, the metadata storage 108 may include information regarding how data is organized in one or more local caches, one or more storage platforms 110, one or more of the cloud platforms 116, and/or the like.

Among other uses, the metadata storage 108 may allow systems and services of the database platform 100 to determine whether a given quantum of data needs to be processed (in connection with, e.g., a given query) without loading or accessing the actual stored data. In various embodiments, metadata stored in the metadata storage 108 may reflect the contents of one or more databases, one or more tables, one or more columns, one or more materialized views, and/or one or more other collections of records, parts of records, and/or other data quanta. With respect to where the metadata storage 108 is actually stored, a separate (e.g., local) storage location (e.g., a key-value store) is used in some embodiments, while in other embodiments the metadata storage 108 is maintained by the database platform 100 as a subset of the data stored in the storage platform 110. Other architectures are possible as well.

The resource manager 104 is also communicatively coupled to the execution platform 106, which may provide multiple computing resources that execute various tasks involving data storage, data retrieval, data analysis (e.g., query processing), and/or the like. In at least one embodiment, the resource manager 104 includes a layer of code (e.g., Java code) that is global with respect to the database platform 100, where that code layer includes instructions for performing functions such as compiling queries and brokering requests to one or more execution nodes in the execution platform 106. In some embodiments, there exists one or more instances of the execution platform 106 that are used for executing client tasks, such as database queries, and one or more instances of the execution platform 106 that are used for executing internal database tasks such as updating metadata, clustering tables, generating materialized views, and/or the like. In some such embodiments, there also exists one or more instances of the execution platform 106 that are used for feature development and/or testing of the database platform 100, and each such instance of the execution platform 106 may be separate from each client-task instance of the execution platform 106, such that, for example, client-task processing is not impacted by feature-development tasks, database-platform-administration tasks, and/or the like. Other arrangements are possible as well.

The execution platform 106 may be coupled to the one or more data-storage devices 112 that are part of the storage platform 110, which may include—and an execution platform 106 may be capable of communicating with—any number of data-storage devices 112. In some embodiments, one or more of the data-storage devices 112 are cloud-based storage devices located in one or more geographic locations. For example, one or more of the data-storage devices 112 may be part of a public cloud infrastructure or a private cloud infrastructure. One or more of the data-storage devices 112 may be or include hard disk drives (HDDs), solid state drives (SSDs), storage clusters, and/or any other data-storage technology. In some examples, the storage platform 110 includes distributed file systems (such as Hadoop Distributed File Systems (HDFSs)), object storage systems, and/or the like.

As shown in FIG. 1, the storage platform 110, including the one or more data-storage devices 112, is decoupled from the computing resources associated with the execution platform 106, the resource manager 104, and the database manager 102 generally. In an embodiment, each of a plurality of database-platform deployments includes a respective storage platform 110 having its own respective one or more data-storage devices. That type of architecture supports dynamic changes to the database platform 100 based on changing data-storage and/or data-retrieval needs, as well as changing needs of users and systems accessing the database platform 100. The support of dynamic changes allows the database platform 100 to scale quickly in response to changing demands on the systems and components within the database platform 100. The decoupling of computing resources from data-storage devices supports the storage of large amounts of data by a given customer without requiring a corresponding large amount of computing resources being dedicated to that customer, and also supports a significant increase in the computing resources utilized by a particular customer at a particular time without requiring a corresponding increase in data-storage resources reserved for that customer.

As a general matter, in at least some embodiments, the database platform 100 can be referred to using terms such as a cloud-based data warehouse, a network-based data warehouse, or simply a data warehouse. A cloud-based data warehouse is one type of network-based data system that can be used for data analysis and reporting, and that includes a central repository of integrated data from one or more disparate sources. A cloud-based data warehouse is commonly an OLAP database that can store current and historical data that can be used for creating analytical reports for an enterprise based on data stored within databases maintained on behalf of the enterprise. To this end, data warehouses often provide business-intelligence tools, tools to perform extract-transform-load (ETL) tasks for ingesting data into the repository, tools to manage and retrieve metadata, and/or the like. There are other types of cloud-based data warehouses, such as OLTP databases, as well as data warehouses and other data systems that operate with characteristics of multiple types of database systems.

Any one or more of the components, devices, systems, and/or the like that are depicted in FIG. 1 and in any of the other figures could be implemented as one or more computing devices having an architecture that is similar to the example computing device 700 that is described below in connection with FIG. 7. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic locations). Moreover, in particular embodiments, any one or more of the communication links depicted in FIG. 1 and in any of the other figures could be implemented via one or more data-communication networks, which may utilize any communication protocol and any type of communication medium or media. In some embodiments, the data-communication networks are a combination of two or more data-communication networks (or sub-networks) coupled to one another. In various different embodiments, these communication links are implemented using one or more of any types of communication medium or media and one or more of any types or examples of communication protocol(s).

First Example Customer Account

Figure 2:
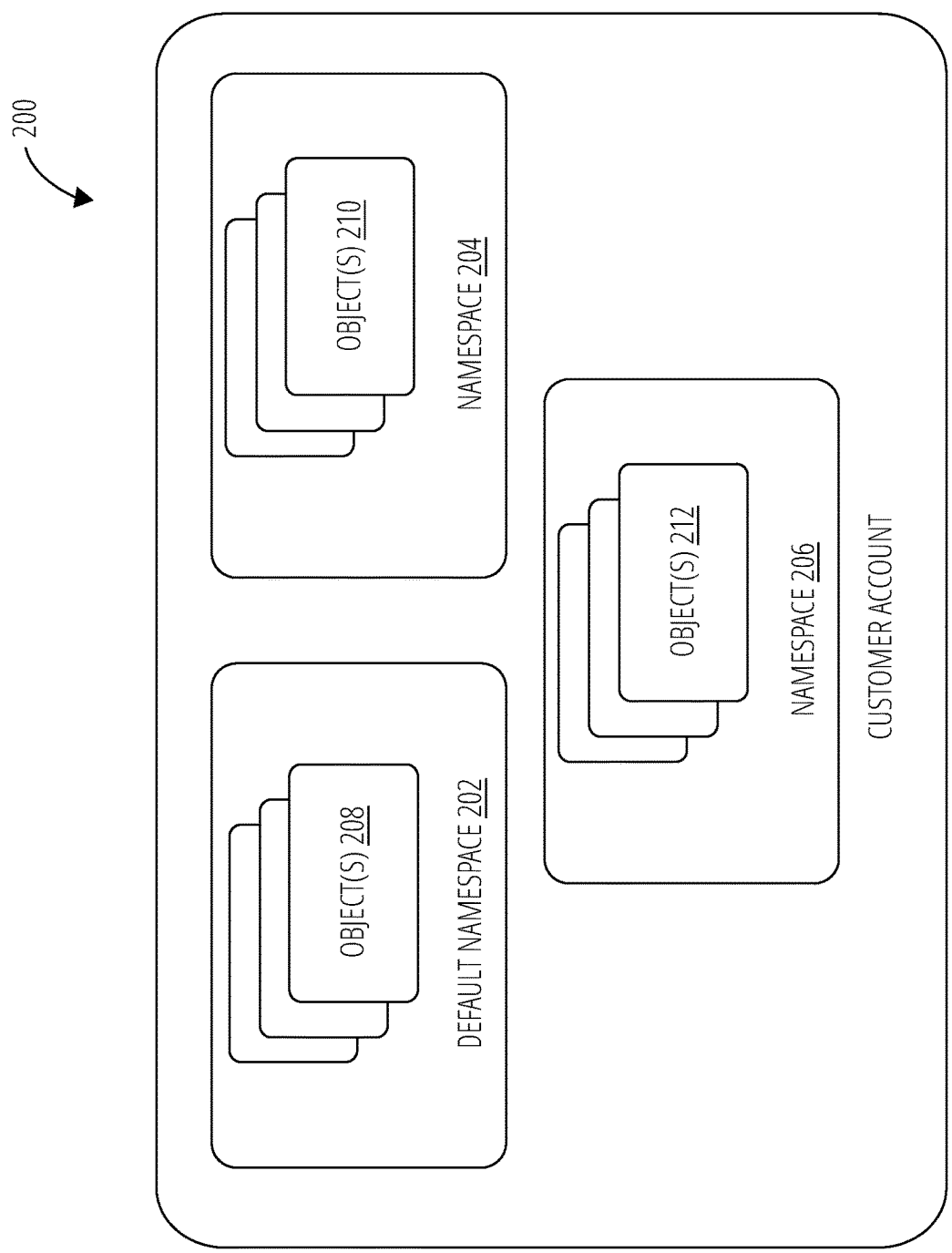
FIG. 2 illustrates a first example customer account, in accordance with at least one embodiment.

FIG. 2 illustrates an example customer account 200, in accordance with at least one embodiment. The database platform 100 (e.g., the database manager 102) may maintain the customer account 200 for a given customer of the database platform 100. The customer account 200 could be maintained in one or more data-storage devices 112 of the storage platform 110. Moreover, the database manager 102 may maintain metadata associated with the customer account 200 in the metadata storage 108. In some instances, the database platform 100 maintains multiple customer accounts for multiple respective customers of the database platform 100.

As depicted in FIG. 2, in some embodiments, the customer account 200 includes multiple objects that are also referred to in this disclosure at times as namespaces, namespace objects, account-level namespaces, and the like. In the example that is shown in FIG. 2, the customer account 200 includes a default namespace 202, a namespace 204, and a namespace 206. Also as depicted, the default namespace 202 contains one or more objects 208, the namespace 204 contains one or more objects 210, and the namespace 206 contains one or more objects 212. Any object 208, object 210, or object 212 could be a user object (user), a role object (role), a warehouse object (warehouse, which may also be referred to as a virtual warehouse or virtual-warehouse object), a resource-monitor object (resource monitor), an integration object (integration), a database object (database), or another kind of object.

A resource monitor may be an object that is used to help customers keep costs down and avoid unexpected costs by enforcing limits on computing resources of the database platform 100 (e.g., the execution platform 106) that are used by customers. In some cases, limits can be defined by time periods (e.g., days, weeks, etc.), time durations (1 hour, 24 hours, etc.), and/or the like, and may limit money spent, credits spent, and/or the like.

An integration may be an object that defines an interface between the database platform 100 and one or more third-party services. Example types of integrations include security integrations (for interfacing with, e.g., third-party authentication services), storage integrations (for interfacing with, e.g., identity-and-access-management (IAM) functions of third-party storage services (e.g., cloud storage services)), notification integrations (for interfacing with, e.g., third-party messaging services (e.g., cloud message queueing services)), and application-programing-interface (API) integrations (for interfacing with, e.g., third-party functions, which may also be referred to herein as external functions). One or more other types of integrations could be defined as well.

In some embodiments, the objects 208 in the default namespace 202 are or at least include one or more objects that are created by the customer that is associated with the customer account 200. The objects 208 may be or at least include persisted account-level objects such as users, roles, databases, and/or the like. The objects 208 may also include persisted child objects such as schemas, tables, views, stored procedures, sequences, stages, streams, tasks, functions (e.g., user-defined functions (UDFs)), and/or the like. Sequences may be objects that are used to generate unique numbers across sessions and statements, including concurrent statements. As used herein, a stage is an object that represents a storage location. In some embodiments, stages can be internal or external to the database platform 100. Internal stages may reside on the storage platform 110 while external stages may reside on a cloud platform 116. Streams may be objects that are used to track change-data-capture (CDC) information with respect to, e.g., a table. Tasks may be objects used to, e.g., automate Structured Query Language (SQL) statements, stored procedures, and/or the like.

Moreover, the customer account 200 could include any number of account-level namespaces, including any number of temporary account-level namespaces that may be respectively associated with database sessions engaged in by one or more users in the customer account 200. Temporary account-level namespaces are further discussed below. By way of example and not limitation, three namespaces are depicted in the customer account 200 in FIG. 2. In at least one embodiment, a given one of the objects 208 and a given one of the objects 210 could have the same name (and could be of the same type (e.g., they could both be roles)) without resulting in a name collision, since the database manager 102 may be configured to set a given namespace as a current context for a given user and resolve object names within the current context (i.e., within the current namespace), as described more fully below. Thus, in such embodiments, one advantage of using account-level namespaces in the manner described herein is that name collisions are avoided. In such embodiments, then, a user can choose names for objects within a given account-level namespace without having to be concerned with the possibility of name collisions with objects that exist in the customer account 200 but external to the given namespace.

Moreover, in at least one embodiment, the one or more objects 208 in the default namespace 202 are visible to one or more users defined in the default namespace of the account of the associated customer, whereas the one or more objects in either or both of the namespace 204 and the namespace 206 are not. For example, the one or more objects 208 in the default namespace 202 may be visible to the client 114 whereas the one or more objects 210 in the namespace 204 may not be visible to the client 114. In at least one embodiment, a namespace-usage privilege is defined such that a user that has been granted a role, where that role has been granted the namespace-usage privilege on a given namespace, would have visibility to objects that are defined in that namespace.

Example Method of Using Account-Level
Namespaces for Database Platforms

Figure 3:
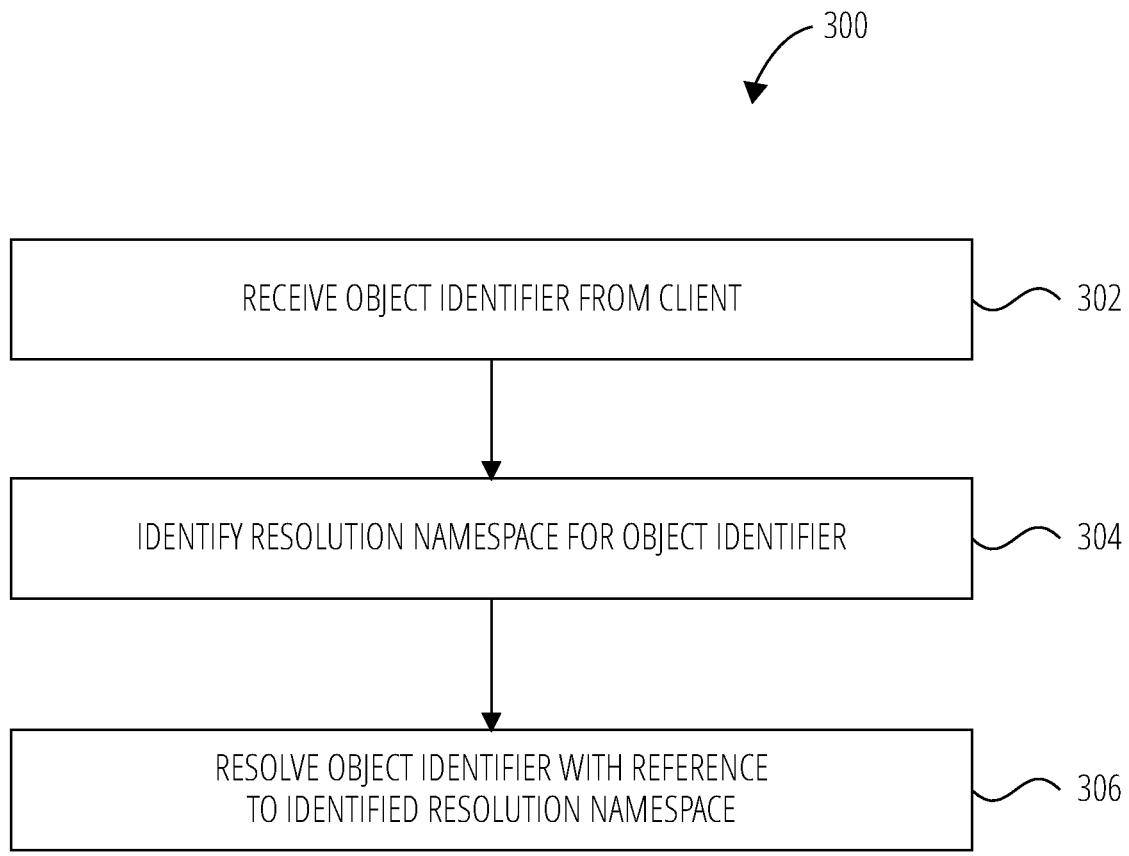
FIG. 3 illustrates a first example method, in accordance with at least one embodiment.

FIG. 3 illustrates an example method 300, in accordance with at least one embodiment. In various different embodiments, the method 300 could be performed by any computing and communication device or system of such devices that is suitably programmed or otherwise arranged to perform the operations described herein. In at least one embodiment, the method 300 is performed by one or more hardware processors. In some embodiments, all or part of the method 300 is performed by the database manager 102, which may involve one or more aspects of the method 300 being performed by the resource manager 104, one or more aspects of the method 300 being performed by the execution platform 106, and/or one or more aspects of the method 300 being performed by one or more other functional components of the database manager 102. By way of example and not limitation, the method 300 is described below as being performed by the database manager 102, and this description makes reference by way of example to other elements depicted in one or more of the other figures.

At operation 302, the database manager 102 receives an object identifier from a client 114 in association with a database session, where the client 114 is associated with the customer account 200, and where the database session is associated with the client 114. In some instances, the object is a standalone account-level object in the customer account 200—for example, the object could be a user object, a role object, a virtual-warehouse object, a resource-monitor object, an integration object, a database object, or another type of account-level object.

In some instances, the object may be an account-level object with a child object (e.g., a table) also specified; in that case, the database manager 102 may use a parser to identify the account-level-object identifier. For example, the database manager 102 may receive, among other data, a string such as "database_name+table_name" where the "+" sign is a delimiting character chosen arbitrarily for use in this disclosure.

It is noted that, in some implementations, a namespace can be encoded as part of an object identifier, in which case that specified namespace is, as is also described below, used for resolving the object identifier, regardless of whether or not that specified namespace is the current account-level namespace of the database session. For example, in a context in which the current account-level namespace of a current database session is called "namespace01," an object identifier such as "namespace02+database01" (where, again, the "+" sign is an arbitrarily chosen delimiter) may be used (in, e.g., a query), in which case the namespace "namespace02" will be used (rather than the namespace "namespace01") for resolving "database01."

Returning to the example of the object identifier being "database_name+table_name," a parser may be used to identify "database_name" as the account-level-object identifier. In some cases, the database manager 102 may receive the object identifier as part of a connection string or other messaging related to establishing a connection between the client 114 and the database platform 100. In the present disclosure, the term "connection string" is used to refer to an actual connection string but also to connection-establishment messaging generally. Some embodiments support reference from one namespace to objects in another namespace using fully qualified names that may include one or more such delimiting characters.

At operation 304, in response to receiving the object identifier at operation 302, the database manager 102 identifies a resolution namespace for the object identifier, where the resolution namespace for the object identifier is a namespace specified in the object identifier if the object identifier includes a specified namespace, and where the resolution namespace otherwise a current account-level namespace of the database session. In some instances, the connection string specifies a namespace, in which case the database manager 102 may use that specified namespace as the current account-level namespace of the database session. In other instances, once a session has been established for the client 114, the client 114 may issue a command to the database manager 102 to set a namespace specified in the command as the current account-level namespace of the database session.

In some cases, prior to receiving such a command (i.e., a set-current-namespace command), the database manager 102 may receive, from the client 114 (or a different client 114), a namespace-creation command for that namespace prior to receiving the set-current-namespace command, where the namespace-creation command specifies the name of the namespace. In response to having received the namespace-creation command, the database manager 102 may have created the namespace (e.g., the namespace 204) with the specified name. In some embodiments, a user may need a specific privilege to be allowed by the database manager 102 to create an account-level namespace. In some cases, the namespace-creation command may come from an administrative account of the database platform 100. The database manager 102 may create the requested namespace 204 as an account-level namespace object in the customer account 200. That object may have a namespace-identifier property set equal to the specified name. The database manager 102 may also associate a pseudorandom alphanumeric or numeric identifier with the newly created account-level-namespace object.

Moreover, it may occur during the session that the client 114 requests creation of an object such as a database in the namespace 204. In response to receiving that object-creation request, the database manager 102 may create the requested object in the customer account 200, and set a namespace-identifier property of the created object equal to an identifier of the current account-level namespace of the database session, which in this example is the namespace 204. That namespace-identifier property of the created object could be set equal to the name or other alphanumeric or numeric identifier of the namespace 204. Multiple objects in a given namespace such as the namespace 204 may have their respective namespace-identifier property set equal to such a namespace identifier.

The namespace 204 is an example of a persisted (i.e., non-temporary) account-level namespace. The corresponding namespace object may have a session-identifier property set equal to a null value, or may not have a session-identifier property, since the namespace 204 is, in at least one embodiment, not associated only (e.g., uniquely) with the ongoing database session. Similarly, objects in a non-temporary namespace may have a session-identifier property set to a null value or may not have a session-identifier property.

In some instances and in accordance with some embodiments, the database manager 102 creates a temporary namespace that is uniquely associated with the ongoing database session. The corresponding namespace object may have a session-identifier property set equal to a session identifier of the current database session. A temporary namespace may be used to contain temporary objects such as temporary tables. In at least one embodiment, when the session ends, the temporary namespace is deleted, as are any temporary objects in that temporary namespace. Temporary-namespace objects may have a session-identifier property set equal to an identifier of the ongoing session. In at least one embodiment, names of temporary objects outrank non-temporary objects with respect to name resolution; in at least one other embodiment, the opposite is true.

At operation 306, the database manager 102 resolves the object identifier (that was received from the client 114 at operation 302) with reference to the resolution namespace (that was identified at operation 304 for the object identifier), where that resolution namespace is a namespace specified in the object identifier if the object identifier includes such a specification, and is otherwise the current account-level namespace of the database session. In at least one embodiment, the resolving of the object identifier includes identifying an object corresponding to the object identifier in the customer account 200. In some instances, the object identifier is or includes an object name, and operation 306 involves conducting a name resolution of the object name with reference to the identified resolution namespace for the object identifier. The name-resolution process may identify the object corresponding to the object name in the customer account 200.

In one example, the provided account-level-object identifier corresponds to a database in the namespace 204 in the customer account 200. The account-level-object identifier may be received in a query from the client 114, where the query is directed to that database. After using the identifier to identify the database, the database manager 102 may process the query with respect to the associated database.

Moreover, deletion of an account-level namespace can be treated differently in different embodiments. In at least one embodiment, deletion of an account-level namespace results in deletion of the one or more objects contained in that account-level namespace. In some such embodiments, the customer account 200 is the parent object with respect to account-level namespaces, and account-level namespaces are the parent objects with respect to objects inside those namespaces.

In at least one other embodiment, deletion of an account-level namespace does not result in deletion of the one or more objects contained in that account-level namespace. In some such embodiments, the deletion of the account-level namespace results in the namespace-identifier property of each of the one or more objects (that were in that namespace) transitioning from an identifier of the account-level namespace to a second value, which could be an identifier of the default namespace 202, a null value, or another value deemed suitable by those of skill in the art for the particular implementation. Moreover, in some such embodiments, the customer account 200 is the parent object with respect to both account-level namespaces and the objects that are considered to be inside those namespaces. Other implementations are possible as well. In at least one embodiment, when creating a namespace and/or during the lifetime of a namespace, users with sufficient privileges can choose a value for a setting that controls whether or not deletion of that namespace will result in deletion of the objects therein.

With respect to replication of account-level namespaces, in at least one embodiment, the database manager 102 may receive a replication request (from, e.g., a client 114) to replicate an account-level namespace such as the namespace 204. The request could specify that the namespace 204 be replicated in the customer account 200 or replicated to a different customer account. In response to receiving the replication request, the database manager 102 may replicate the namespace 204, where this replicating may involve creating a second account-level namespace that includes a copy of each of the one or more objects in the namespace 204. As stated, the new account-level namespace could be in the same or a different customer account. Thus, account-level namespaces in accordance with embodiments of the present disclosure represent convenient packages of objects that can be replicated as a group. The more instances and types of objects the source namespace (e.g., the namespace 204) includes, the greater the savings in time and frustration.

With respect to the above-mentioned multi-tenant implementations, in at least one embodiment, the customer account 200 may be associated with a first business entity (e.g., a company). Moreover, the namespace 204 may correspond to a first tenant in the customer account 200, where the first tenant is a first customer of the company. Furthermore, the namespace 206 may correspond to a second tenant in the customer account 200, where the second tenant is a second, different customer of the company. Thus, in some implementations, account-level namespaces in accordance with embodiments of the present disclosure can serve as "mini-accounts" for customers of the company associated with the customer account 200. This type of installation facilitates conveniences such as billing tenants along namespace boundaries, and enables customers of the database platform 100 to create applications, services, and/or the like that they can in turn "re-sell" to their own customers.

Figure 4:
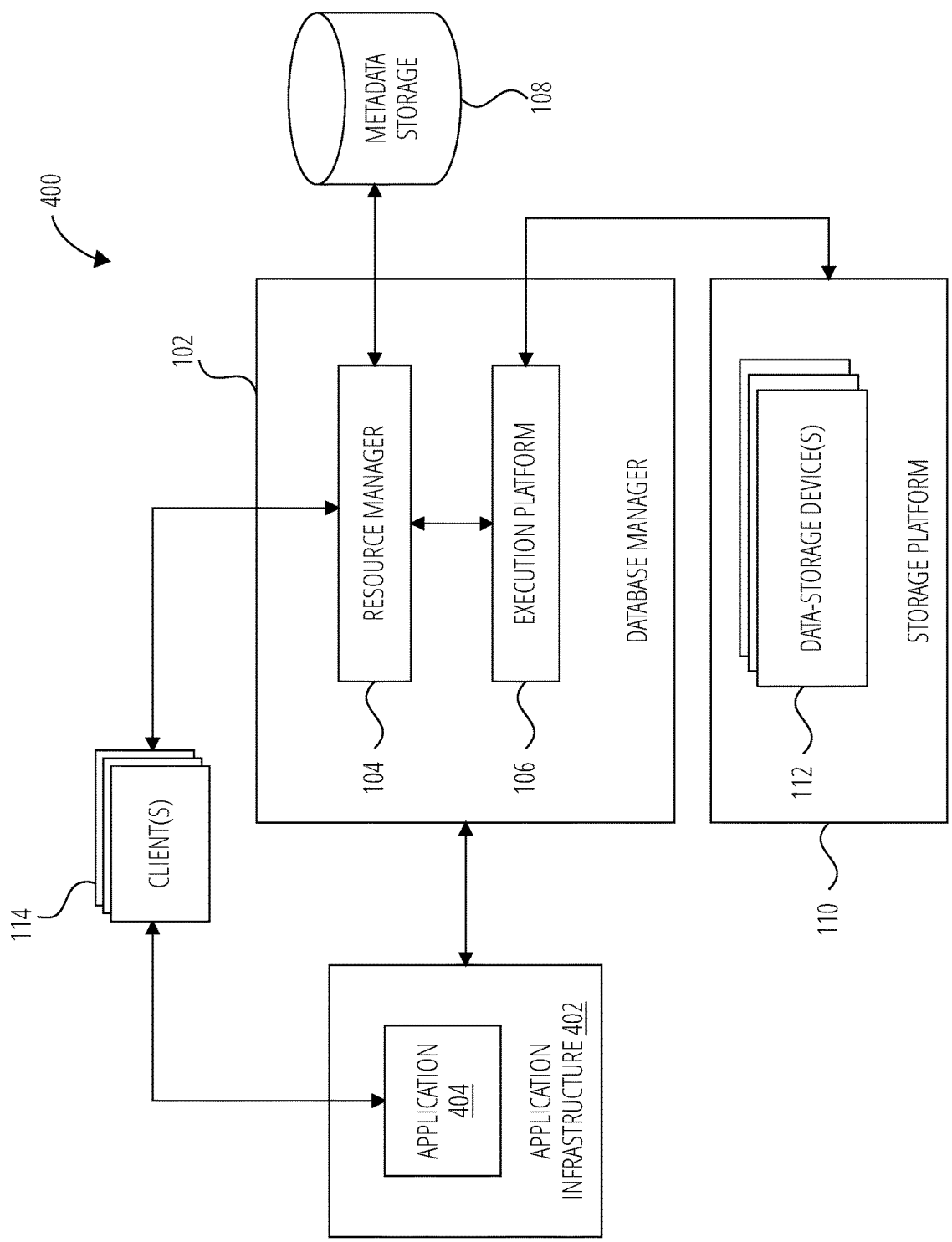
FIG. 4 illustrates an example architecture, in accordance with at least one embodiment.

Example Architecture for Namespace-Based System-User Access of Database Platforms FIG. 4 illustrates an example architecture 400 in which embodiments related to conducting namespace-based system-user access of database platforms can be carried out. Many of the elements in FIG. 4 are shown and described above in connection with FIG. 1, and therefore are not described in detail here. Also, it is noted that the one or more cloud platforms 116 that are depicted in FIG. 1 are not depicted in FIG. 4. This is not by way of limitation; it is just to make FIG. 4 less cluttered and therefore more readable. In any given embodiment, one of more cloud platforms 116 could be present.

In some implementations, a database on the database platform 100 serves as a backend for one or more applications that are executing on one or more application servers, which may reside on an application infrastructure that is separate from the infrastructure of the database platform 100. A given application infrastructure may, though separate, still be associated with the database platform 100. For example, the database platform 100 and the application infrastructure may be managed by a common organization (e.g., a company). Other application infrastructures may be managed by other organizations. On an application infrastructure that is associated with the database platform 100, the database platform 100 may provide one or more applications that, as examples, access customer accounts to store data therein (e.g., store transient data in stages defined in a given customer account), access data stored in customer accounts (e.g., stored in one or more databases in a given customer account), and/or the like.

As shown in FIG. 4, the architecture 400 includes an application infrastructure 402 that includes an example application 404 installed and executing thereon. The application infrastructure 402 may be or include a system of one or more servers, and is depicted as including only a single executing application: the application 404. In various different implementations, the application infrastructure 402 could include any number of executing applications, and these applications could be of any type. In the embodiments that are primarily described herein, the application 404 is a user-interface application that serves as a frontend for clients 114 to use in accessing respective customer accounts on the database platform 100. Another type of application that could be executing on the application infrastructure 402 is an alerts application, which could be configured to monitor various values, tables, databases, streams, and/or the like in the database platform 100, and to provide alerts to one or more clients 114 when one or more conditions are met. Numerous other types of applications could be executing on the application infrastructure 402 as well. In the examples that are primarily described herein, the application infrastructure 402 is an application infrastructure that is associated with the database platform 100.

Moreover, the application infrastructure 402 could also include an entity (not pictured) that implements perimeter protection for the application infrastructure 402 and that may provide additional functions such as serving as a hypertext transfer protocol (HTTP) reverse proxy, managing incoming connections from browsers and/or apps, and/or the like. Such an entity may also perform one or more other functions such as load-balancing, for example. The entity may integrate with applications in the application infrastructure 402 to provide single sign-on (SSO) functionality.

Second Example Customer Account

Figure 5:
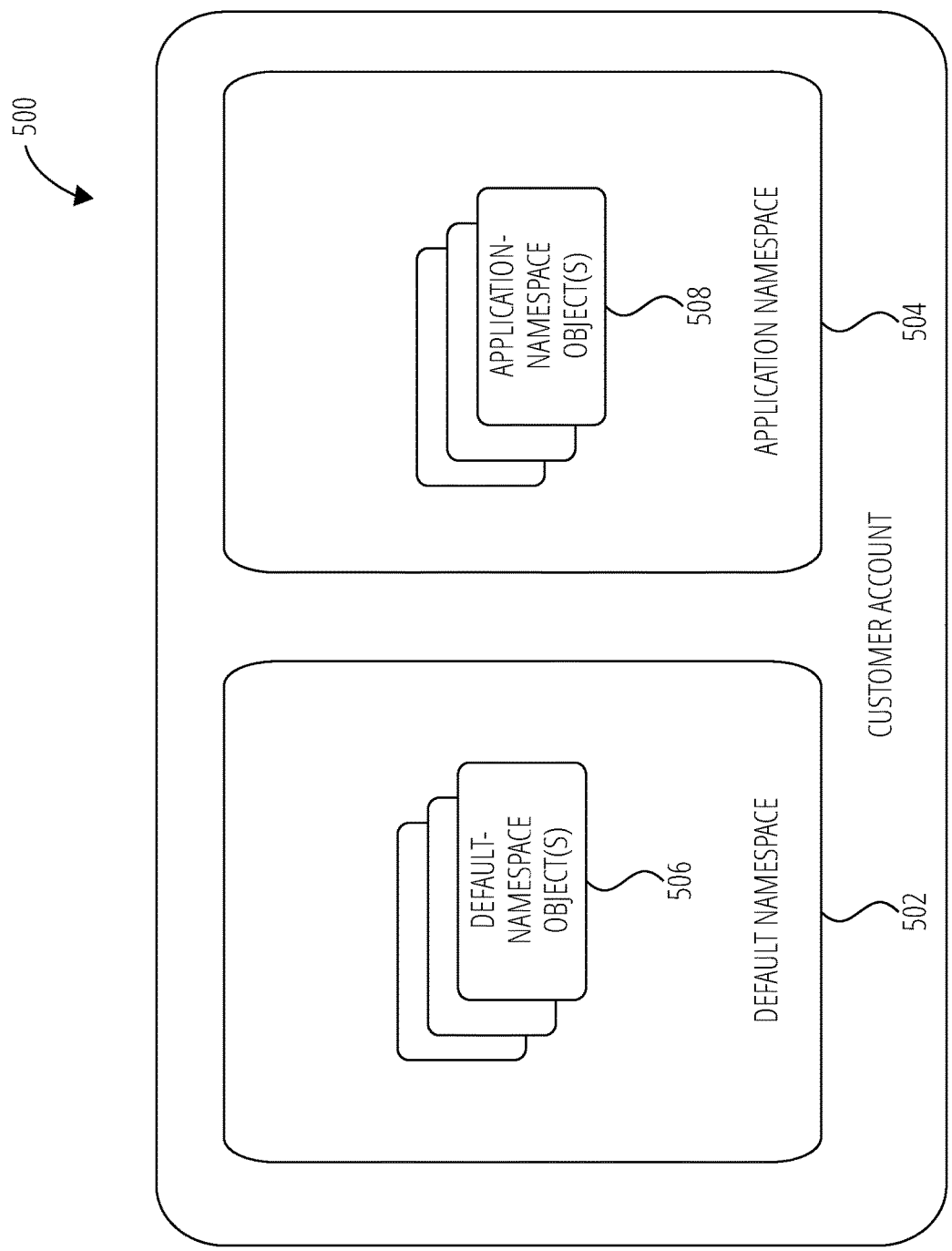
FIG. 5 illustrates a second example customer account, in accordance with at least one embodiment.

FIG. 5 illustrates an example customer account 500 that can be used in connection with, e.g., the architecture 400 of FIG. 4. The database platform 100 (e.g., the database manager 102) may maintain the customer account 500 for a given customer of the database platform 100. The customer account 500 could be maintained in one or more of the data-storage devices 112 of the storage platform 110. Moreover, the database manager 102 may maintain metadata associated with the customer account 500 in, e.g., the metadata storage 108. In some embodiments, the database platform 100 maintains multiple customer accounts for multiple respective customers of the database platform 100.

As depicted in FIG. 5, the customer account 500 includes multiple account-level namespaces: a default namespace 502 and an application namespace 504. The default namespace 502 includes one or more default-namespace objects 506, and the application namespace 504 includes one or more application-namespace objects 508. Any default-namespace object 506 and any application-namespace object 508 could be any type of object, with some examples including users, roles, privileges, databases, and the like. In particular with respect to the application-namespace objects 508, those could include, as examples, one or more application-specific users, one or more application-specific roles for the one or more application-specific users and/or for one or more other users, one or more application-specific databases, and/or the like.

The customer account 500 could include any number of account-level namespaces, including any number of temporary namespaces respectively associated with database sessions engaged in by one or more clients 114 in connection with the customer account 500. Each such database session may have a namespace-identifier property that identifies the account-level namespace in which the associated user (that is conducting the database session) is defined. Moreover, the application 404 may provision for itself (e.g., based on communication from the database platform 100) one or more resources (e.g., users, credentials, roles, accounts, and/or the like) for clients 114 associated with the customer account 500 to use, in accordance with the particular functioning of the application. The default namespace 502 and the application namespace 504 may each be represented by a respective account-level namespace object in the customer account 500. In some implementations, the account-level namespace object for the application namespace 504 is not visible to one or more users (e.g., one or more users defined in the default namespace 502). Moreover, the application 404 itself may be represented by an account-level application object in the default namespace 502, such that the account-level application object is visible to users defined in the default namespace 502. Other implementations are possible as well.

Furthermore, in some embodiments, the database platform 100 implements account-level application namespaces on a per-application-vendor basis. In such embodiments, if a given application vendor implemented multiple applications in their respective vendor-specific application namespace, then objects in that vendor-specific application namespace may be visible across those multiple applications. An organization (e.g., a company) that manages both the database platform 100 and the application infrastructure 402 could be considered to be an application vendor. In some embodiments, account-level application namespaces are implemented on a per-application basis. In some such embodiments, objects within a given application namespace could only be visible to the one application that is associated with that given application namespace, depending on the privileges granted or not granted to users defined outside of that example application namespace. In some embodiments, all of the objects (users, roles, databases, etc.) that the application 404 uses in connection with the customer account 500 are defined in the application namespace 504; that is, in some embodiments, the application 404 does not access any objects that are defined in the customer account 500 other than the one or more application-namespace objects 508, which are defined in the application namespace 504.

As described above, in some embodiments, the application namespace 504 is represented as an account-level namespace object in the customer account 500. In some such embodiments, that object is not visible to the associated customer. The namespace object may be created and owned by a role that is referred to herein as the app-admin role, which is an administrative role with respect to the application 404 and the application namespace 504 in the described examples. The app-admin role may be defined within the application namespace 504 to, among other benefits, avoid name collisions with any roles that are defined outside of the application namespace 504 (e.g., in another namespace such as the default namespace 502). In at least some embodiments, the app-admin role is not owned by an administrative role that exists for the customer in the customer account 500 (e.g., in the default namespace 502).

Indeed, in some embodiments, the above-described app-admin role is not visible to users and other objects defined in the default namespace 502, though this is optional and could be configurable. A support function may be implemented such that the app-admin role can be temporarily granted to the customer's administrative role in instances in which the customer needs to, e.g., address an issue that requires the access usually reserved for the app-admin role. As a general matter, making the app-admin role (and the application namespace 504 generally) not visible to objects in the default namespace 502 can help to protect one or more of the application-namespace objects 508 such as configuration tables and the like, where changes to such objects could have unintended and/or undesired consequences to the customer account 500. For example, some such changes could leave the customer account 500 in an unstable state.

Because they are in different account-level namespaces, a given one of the default-namespace objects 506 and a given one of the application-namespace objects 508 could have the same name (and be of the same type, e.g., they could both be users) without causing a name collision, since the database manager 102 may be configured to set a given namespace as a current context for a given user and resolve object names within the current context (i.e., within the current account-level namespace). Thus, in such embodiments, an advantage of using account-level namespaces in the manner described herein in connection with embodiments of the present disclosure is that name collisions are avoided. Accordingly, in such embodiments, a developer of a given application can choose names for objects without having to be concerned with the possibility of name collisions with objects that exist in the customer account 500 but external to the application namespace 504 (e.g., objects that exist in the default namespace 502).

Example Method of Namespace-Based
System-User Access of a Database Platform

Figure 6:
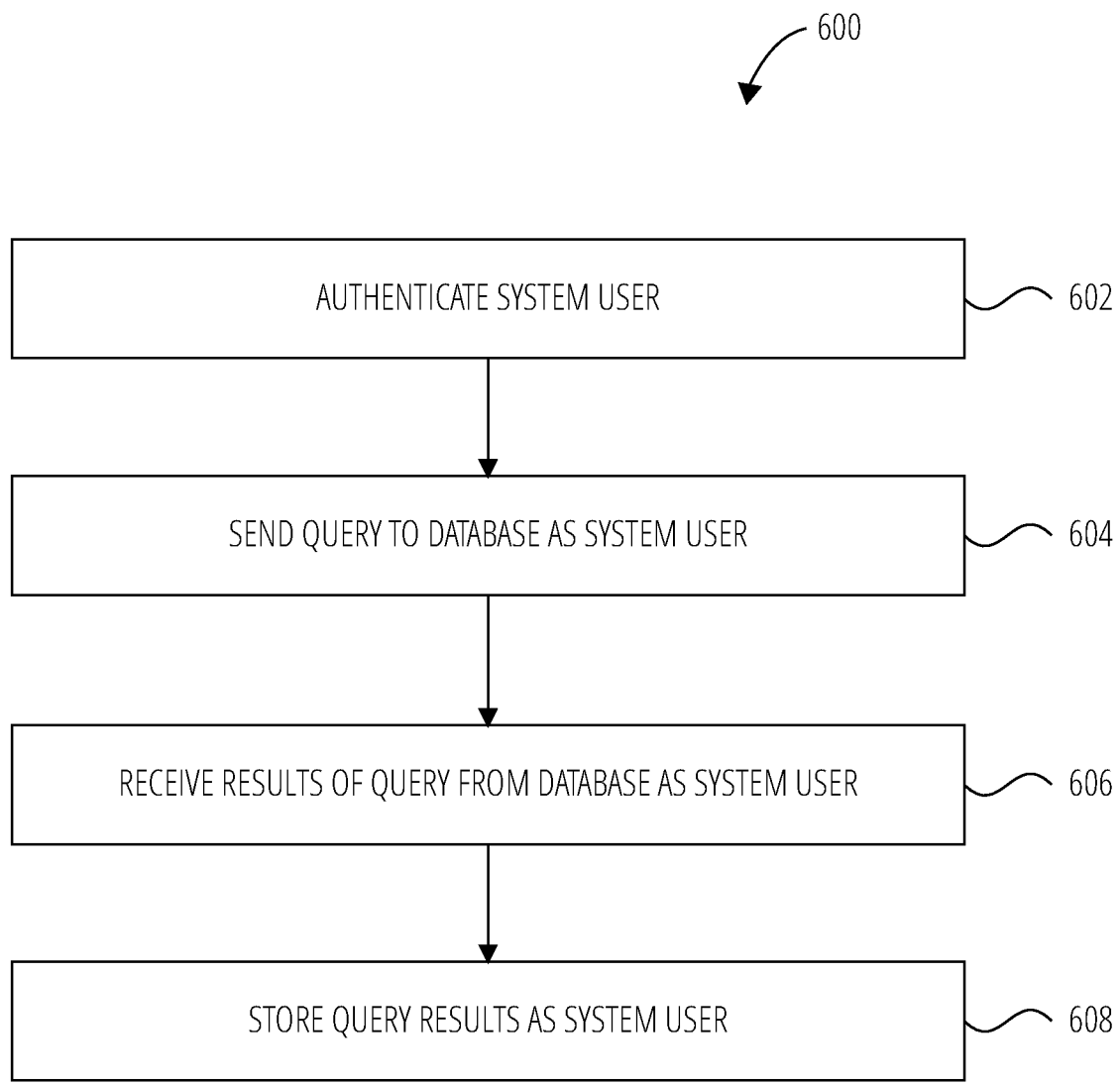
FIG. 6 illustrates a second example method, in accordance with at least one embodiment.

In at least one embodiment, the application 404 may use what is referred to herein as a "system user" (i.e., a programmatic, automated user) to access the data in the customer account 500 on the database platform 100. This may be thought of as the application 404 accessing the database platform 100 as itself. FIG. 6 illustrates an example method 600 in which operations of this sort are carried out. In various different embodiments, the method 600 could be performed by any computing and communication device or system of such devices that is suitably programmed or otherwise arranged to perform the operations described herein. In at least one embodiment, the method 600 is performed by one or more processors. In some embodiments, all or part of the method 600 is performed by the database manager 102, which may involve one or more aspects of the method 600 being performed by the resource manager 104, one or more aspects of the method 600 being performed by the execution platform 106, and/or one or more aspects of the method 600 being performed by one or more other functional components of the database manager 102. By way of example and not limitation, the method 600 is described below as being performed by the database manager 102, and this description makes reference by way of example to other elements depicted in one or more of the other figures.

At operation 602, the database manager 102 authenticates a system user for access via an application to a database associated with a customer account of the database platform. In this example, the application is the application 404 and the customer account is the customer account 500. In at least one embodiment, the system user is an object that is defined in the application namespace 504. That is, in at least one embodiment, the system user is one of the application-namespace objects 508. As mentioned above, the system user is, in at least one embodiment, a programmatic, automated user (as contrasted with a user object that is associated with a human user, for example).

Authentication credentials may have been provisioned for the system user, and the system user may use those credentials to open a session via the application 404 with the database platform 100. In at least one embodiment, at a time when the application 404 was provisioned for the customer account 500, credentials may have been created and roles may have been granted to the associated clients. The application 404 could then, as further described by way of example below, use those credentials and roles to connect to the database platform 100 to perform operations on the customer account 500, based on the privileges granted at provisioning time. Other implementations are possible as well.

The above-mentioned session may be created by way of a 2-legged authentication flow using, e.g., OAuth. In an embodiment, the application 404 uses the system user's identity to connect to the database platform 100. An example authentication flow may include the application 404 providing its credentials (e.g., an application-client identifier (e.g., username) and secret (e.g., password)) to the database platform 100, which may then return an access token (e.g., an OAuth Access Token) to the application 404. The application 404 may then use that access token when opening a connection with the database platform 100, which may return a session token to the application 404. That session token may have the identity of the system user embedded therein. The application 404 may then conduct the session using the issued session token.

That 2-legged authentication flow may be different from an authentication flow that a user object associated with a human user may use to authenticate to the database platform 100 via the same application 404. When accessing the database platform 100 via the application 404, the user may engage in what is known as a 3-legged authentication flow using, e.g., OAuth. In this 3-legged authentication flow, which may also be referred to as an SSO flow, the user accesses the application 404. The application 404 may then redirect the user to the database platform 100, which may prompt the user to provide the user's credentials and in return provide the user (via, e.g., a client 114) with a code. The database platform 100 may then redirect that client 114 back to the application 404, at which point the client 114 may provide that code to the database platform 100.

Further as part of the example 3-legged authentication flow, the application 404 may then provide that code as well as the credentials (e.g., user identifier and password or other secret) of the application 404 to the database platform 100, which may then return an access token (e.g., an OAuth Access Token) to the application 404. The application 404 may then use that access token to open a connection with the database platform 100, which may then issue a session token to the application 404, where that session token has the identity of the user embedded in it. The application 404 may then use that session token to access the database platform 100 during the associated session, which the database platform 100 may bind to the user identity and therefore to the default namespace 502 in which that user object was defined. If the user object for that user is defined in a different account-level namespace, the database platform 100 may bind the session to that account-level namespace instead. During the session, the user may, via the client 114, issue queries, receive results, and the like.

Returning to the example in which the system user is accessing the database platform 100 via the application 404, in at least one embodiment, following the above-described 2-legged authentication flow, the system user may then be able to perform one or more database operations directly on the data maintained for the customer account 500 by the database platform 100. These database operations could include running queries, receiving results, downloading results of queries performed by other users, and/or the like. The session may be bound to the system user and therefore to the application namespace 504. In instances in which the system user is defined in another account-level namespace such as the default namespace 502 or a different account-level namespace, the session may be bound to the account-level namespace in which the system user is defined. As described above, in some embodiments, the application-namespace objects 508 in the application namespace 504 are not visible to the default-namespace object 506 in the default namespace 502. Furthermore, in at least one embodiment, the system user could use an object identifier that specifies the name of a namespace other than the application namespace 504, in which case the namespace that is specified in that particular object identifier would be used to resolve the object, further taking into account any further-specified object-identifier information; in at least one such embodiment, that described resolution is contingent on the system user having corresponding privileges such as a usage privilege on that other namespace, a usage privilege on the referenced object, and/or the like.

At operation 604, the database manager 102 sends, as the system user via the application 404, a query to the database that is associated in the database platform 100 with the customer account 500. At operation 606, the database manager 102 receives, as the system user, results of the query from the database. At operation 608, the database manager 102 stores, as the system user, the results of the query in a stage in the application namespace 504. That is, in this example, the stage is one of the application-namespace objects 508 in the application namespace 504. In various different embodiments, the database manager 102 may conduct, as the system user, a database session with respect to a database associated with the customer account 200. Within such a database session, the system user may conduct one or more database transactions on the database, where the one or more database transactions include storing data, causing ingestion of data, removing data, modifying data, inserting data, running one or more queries on the data (such as the query of operation 604, operation 606, and operation 608, for example), creating one or more materialized views, and/or the like.

In some cases, after a human user (or any other user such as another system user) performs a given query and receives results, the system user may detect (e.g., may be notified by the database platform 100, or may poll for such events, and/or the like) that a user account associated with that other user has been used to perform that query and receive query results of that query. Upon making this detection, the system user may open a session, download those same results, and store them in a stage in the application namespace 504. The system user may, depending on the role granted to it and the privileges granted to that role, be able to create and/or modify the schema of tables, tasks, stored procedures, and/or one or more other of the application-namespace object 508 in the application namespace 504 in the customer account 500.

In some embodiments, there is only one type of user object, and both human users and system users are instances of that type. In other embodiments, there are different user-object types for human users and system (e.g., app-instance) users. A system user may be able to request a Uniform Resource Locator (URL) for a given stage in the customer account 500, and then use that URL to access the given stage and store data there. The data that the system user stores in one or more stages in the application namespace 504 may be made accessible to one or more human users via a dashboard or other type of user interface of the application 404. In some cases, the system user may run one or more queries (that, e.g., take a long time) overnight, store the results of such one or more queries in, e.g., a stage in the application namespace 504, and provide access to those results (e.g., make those results available) via an interface such as the aforementioned dashboard. Other implementations are possible as well.

Example Computing Device

Figure 7:
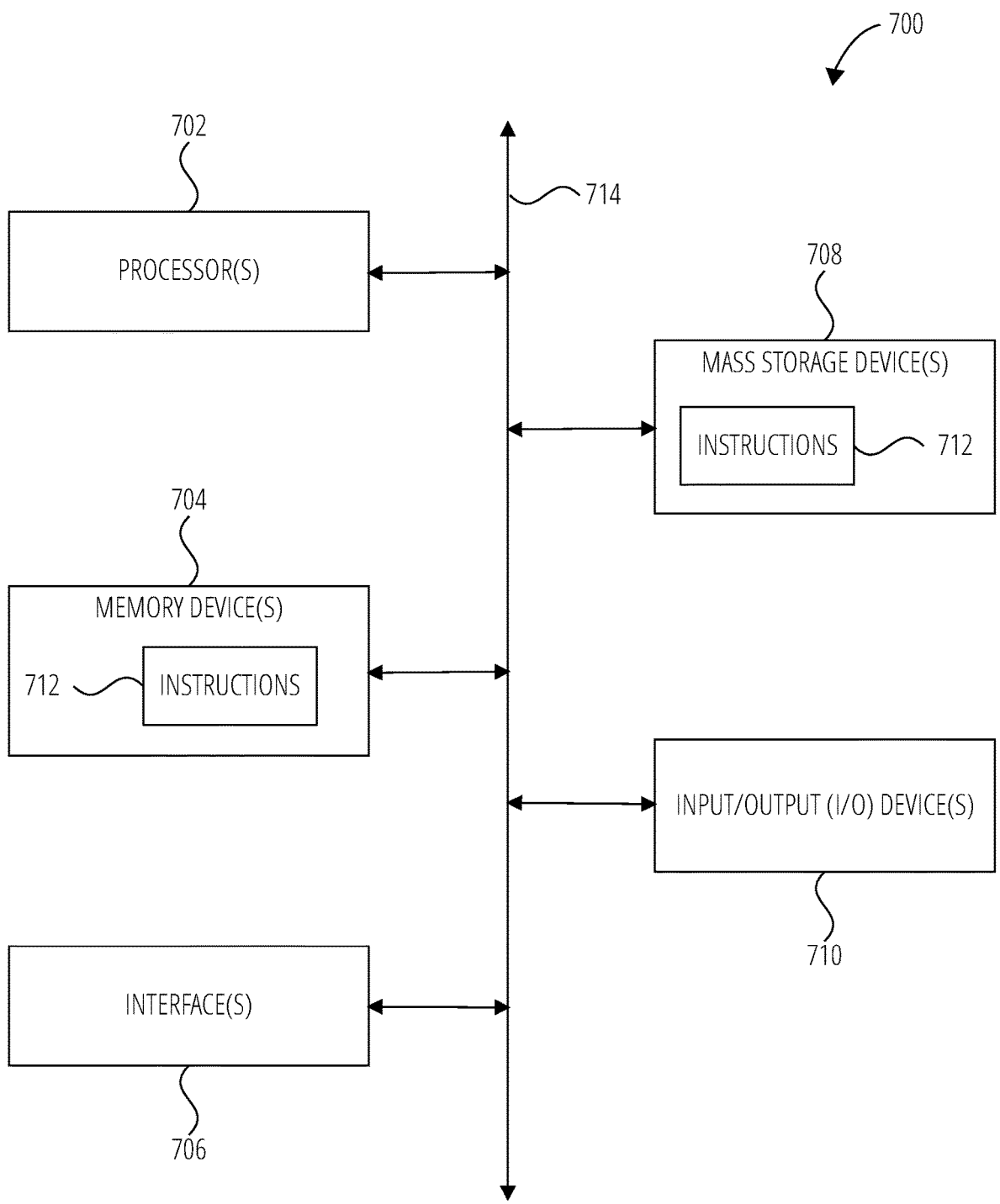
FIG. 7 illustrates an example computing device, in accordance with at least one embodiment.

FIG. 7 illustrates an example computing device 700, in accordance with at least one embodiment. In some embodiments, the computing device 700 is used to implement one or more of the systems and components discussed herein. Further, the computing device 700 may interact with any of the systems and components described herein. Accordingly, the computing device 700 may be used to perform various procedures and tasks, such as those discussed herein. The computing device 700 can function as a server, a client, or any other computing entity. The computing device 700 can be any of a wide variety of computing devices, such as a desktop computer, a notebook computer, a server computer, a handheld computer, a mobile device, a tablet, and/or the like.

In the depicted embodiment, the computing device 700 includes one or more processor(s) 702, one or more memory device(s) 704, one or more interface(s) 706, one or more mass storage device(s) 708, and one or more input/output device(s) 710, all of which are coupled to a bus 714. The processor(s) 702 includes one or more processors or controllers that execute instructions stored in the memory device(s) 704 and/or the mass storage device(s) 708.

The memory device(s) 704 can include various computer-storage media, such as volatile memory (e.g., random access memory (RAM)) and/or nonvolatile memory (e.g., read-only memory (ROM)). The memory device(s) 704 may also include rewritable ROM, such as Flash memory. The processor(s) 702 may also include various types of computer-storage media, such as cache memory.

The interface(s) 706 may include various interfaces that allow the computing device 700 to interact with other systems, devices, computing environments, and/or the like. Example interface(s) 706 include any number of different network interfaces, such as interfaces to local area networks (LANs), wide area networks (WANs), wireless networks, the Internet, and/or the like.

The mass storage device(s) 708 may include various computer-storage media, such as magnetic tapes, magnetic disks, optical disks, solid-state memory (e.g., Flash memory), and so forth. Various drives may also be included in the mass storage device(s) 708 to enable reading from and/or writing to the various computer-storage media. The mass storage device(s) 708 may include removable media and/or non-removable media.

The input/output device(s) 710 may include various devices that allow data and/or other information to be input to and/or retrieved from the computing device 700. Example input/output device(s) 710 include cursor-control devices, keyboards, keypads, microphones, monitors or other display devices, speakers, printers, network interface cards, modems, lenses, CCDs or other image-capture devices, and the like.

The bus 714 allows the processor(s) 702, the memory device(s) 704, the interface(s) 706, the mass storage device(s) 708, and the input/output device(s) 710 to communicate with one another, as well as with other devices or components that may be coupled to the bus 714. The bus 714 represents one or more of several types of bus structures, such as a system bus, a PCI bus, an IEEE 1394 bus, a USB bus, and/or the like. In some examples, the bus 714 includes one or more network connections.

For purposes of illustration, programs and other executable program components are shown herein as discrete blocks, although it is understood that such programs and components may reside at various times in different storage components of the computing device 700 and are executed by the processor(s) 702. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The various memories may store one or more sets of instructions 712 and data structures (e.g., software) embodying or utilized by any one or more of the methodologies or functions described herein. These instructions 712, when executed by the processor(s) 702, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and one or more utilized couplings may be Code Division Multiple Access (CDMA) connections, Global System for Mobile communications (GSM) connections, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 712 may be transmitted or received over a network using a transmission medium via a network interface device (e.g., a network interface component) and utilizing any one of a number of well-known transfer protocols (e.g., hypertext transfer protocol (HTTP)). Similarly, the instructions 712 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 712 for execution by the computing device 700, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

EXAMPLES OF EMBODIMENTS

Following is a list of some examples of embodiments.

Example 1 is a method that includes receiving, by a database platform that includes at least one hardware processor, an object identifier from a client in association with a database session, the client being associated with a customer account of the database platform, the database session being associated with the client; identifying, by the database platform in response to receiving the object identifier, a resolution namespace for the object identifier, the resolution namespace for the object identifier being a namespace specified in the object identifier if the object identifier includes a specified namespace, the resolution namespace otherwise being a current account-level namespace of the database session; and resolving, by the database platform, the object identifier with reference to the identified resolution namespace for the object identifier, the resolving of the object identifier including identifying an object corresponding to the object identifier in the customer account.

Example 2 is the method of Example 1, where the object includes (e.g., is) an account-level object in the customer account.

Example 3 is the method of Example 2, where the account-level object includes a database object that is associated with a database in the customer account; receiving the object identifier includes receiving a query directed to the database, where the query includes the object identifier; the identifying of the object corresponding to the object identifier in the customer account includes identifying the database object; and the method further includes processing the query with respect to the associated database.

Example 4 is the method of any of the Examples 1-3, further including receiving, from the client in association with the database session, a set-current-namespace command to set a namespace specified in the set-current-namespace command as the current account-level namespace of the database session; and setting, in response to receiving the set-current-namespace command, the specified namespace as the current account-level namespace of the database session.

Example 5 is the method of any of the Examples 1-4, where a namespace object in the customer account represents the current account-level namespace of the database session.

Example 6 is the method of Example 5, where the namespace object includes a namespace identifier; and the current account-level namespace of the database session contains one or more objects, each such object having a namespace-identifier property set equal to the namespace identifier.

Example 7 is the method of any of the Examples 1-6, where the customer account includes a first account-level namespace; the first account-level namespace contains one or more objects; and deletion of the first account-level namespace results in deletion of the one or more objects contained in the first account-level namespace.

Example 8 is the method of any of the Examples 1-7, where the customer account includes a first account-level namespace; the first account-level namespace contains one or more objects; and deletion of the first account-level namespace does not result in deletion of the one or more objects contained in the first account-level namespace.

Example 9 is the method of any of the Examples 1-8, where the customer account includes a first account-level namespace; the first account-level namespace contains one or more objects; and the method further includes receiving a replication request to replicate the first account-level namespace; and in response to receiving the replication request, replicating the first account-level namespace, the replicating of the first account-level namespace including creating a second account-level namespace, the second account-level namespace including copies of the one or more objects.

Example 10 is the method of any of the Examples 1-9, where the customer account is associated with a first business entity; the customer account includes a first namespace corresponding to a first tenant in the customer account, the first tenant including (e.g., being) a first customer of the first business entity; and the customer account further includes a second namespace corresponding to a second tenant in the customer account, the second tenant including (e.g., being) a second customer of the first business entity.

Example 11 is a database platform that includes at least one hardware processor; and one or more computer-storage media containing instructions executable by the at least one hardware processor for causing the at least one hardware processor to perform operations including receiving an object identifier from a client in association with a database session, the client being associated with a customer account of the database platform, the database session being associated with the client; identifying, in response to receiving the object identifier, a resolution namespace for the object identifier, the resolution namespace for the object identifier being a namespace specified in the object identifier if the object identifier includes a specified namespace, the resolution namespace otherwise being a current account-level namespace of the database session; and resolving the object identifier with reference to the identified resolution namespace for the object identifier, the resolving of the object identifier including identifying an object corresponding to the object identifier in the customer account.

Example 12 is the database platform of Example 11, where the object includes (e.g., is) an account-level object in the customer account.

Example 13 is the database platform of Example 12, where the account-level object includes a database object that is associated with a database in the customer account; receiving the object identifier includes receiving a query directed to the database, where the query includes the object identifier; the identifying of the object corresponding to the object identifier in the customer account includes identifying the database object; and the operations further include processing the query with respect to the associated database.

Example 14 is the database platform of any of the Examples 11-13, the operations further including receiving, from the client in association with the database session, a set-current-namespace command to set a namespace specified in the set-current-namespace command as the current account-level namespace of the database session; and setting, in response to receiving the set-current-namespace command, the specified namespace as the current account-level namespace of the database session.

Example 15 is the database platform of any of the Examples 11-14, where a namespace object in the customer account represents the current account-level namespace of the database session.

Example 16 is the database platform of Example 15, where the namespace object includes a namespace identifier; and the current account-level namespace of the database session contains one or more objects, each such object having a namespace-identifier property set equal to the namespace identifier.

Example 17 is the database platform of any of the Examples 11-16, where the customer account includes a first account-level namespace; the first account-level namespace contains one or more objects; and deletion of the first account-level namespace results in deletion of the one or more objects contained in the first account-level namespace.

Example 18 is the database platform of any of the Examples 11-17, where the customer account includes a first account-level namespace; the first account-level namespace contains one or more objects; and deletion of the first account-level namespace does not result in deletion of the one or more objects contained in the first account-level namespace.

Example 19 is the database platform of any of the Examples 11-18, where the customer account includes a first account-level namespace; the first account-level namespace contains one or more objects; and the operations further include receiving a replication request to replicate the first account-level namespace; and in response to receiving the replication request, replicating the first account-level namespace, the replicating of the first account-level namespace including creating a second account-level namespace, the second account-level namespace including copies of the one or more objects.

Example 20 is the database platform of any of the Examples 11-19, where the customer account is associated with a first business entity; the customer account includes a first namespace corresponding to a first tenant in the customer account, the first tenant including (e.g., being) a first customer of the first business entity; and the customer account further includes a second namespace corresponding to a second tenant in the customer account, the second tenant including (e.g., being) a second customer of the first business entity.

Example 21 is one or more computer-storage media containing instructions executable by at least one hardware processor (of, e.g., a database platform) for causing the at least one hardware processor to perform operations including receiving an object identifier from a client in association with a database session, the client being associated with a customer account of a database platform, the database session being associated with the client; identifying, in response to receiving the object identifier, a resolution namespace for the object identifier, the resolution namespace for the object identifier being a namespace specified in the object identifier if the object identifier includes a specified namespace, the resolution namespace otherwise being a current account-level namespace of the database session; and resolving the object identifier with reference to the identified resolution namespace for the object identifier, the resolving of the object identifier including identifying an object corresponding to the object identifier in the customer account.

Example 22 is the one or more computer-storage media of Example 21, where the object includes (e.g., is) an account-level object in the customer account.

Example 23 is the one or more computer-storage media of Example 22, where the account-level object includes a database object that is associated with a database in the customer account; receiving the object identifier includes receiving a query directed to the database, where the query includes the object identifier; the identifying of the object corresponding to the object identifier in the customer account includes identifying the database object; and the operations further include processing the query with respect to the associated database.

Example 24 is the one or more computer-storage media of any of the Examples 21-23, the operations further including receiving, from the client in association with the database session, a set-current-namespace command to set a namespace specified in the set-current-namespace command as the current account-level namespace of the database session; and setting, in response to receiving the set-current-namespace command, the specified namespace as the current account-level namespace of the database session.

Example 25 is the one or more computer-storage media of any of the Examples 21-24, where a namespace object in the customer account represents the current account-level namespace of the database session.

Example 26 is the one or more computer-storage media of Example 25, where the namespace object includes a namespace identifier; and the current account-level namespace of the database session contains one or more objects, each such object having a namespace-identifier property set equal to the namespace identifier.

Example 27 is the one or more computer-storage media of any of the Examples 21-26, where the customer account includes a first account-level namespace; the first account-level namespace contains one or more objects; and deletion of the first account-level namespace results in deletion of the one or more objects contained in the first account-level namespace.

Example 28 is the one or more computer-storage media of any of the Examples 21-27, where the customer account includes a first account-level namespace; the first account-level namespace contains one or more objects; and deletion of the first account-level namespace does not result in deletion of the one or more objects contained in the first account-level namespace.

Example 29 is the one or more computer-storage media of any of the Examples 21-28, where the customer account includes a first account-level namespace; the first account-level namespace contains one or more objects; and the operations further include receiving a replication request to replicate the first account-level namespace; and in response to receiving the replication request, replicating the first account-level namespace, the replicating of the first account-level namespace including creating a second account-level namespace, the second account-level namespace including copies of the one or more objects.

Example 30 is the one or more computer-storage media of any of the Examples 21-29, where the customer account is associated with a first business entity; the customer account includes a first namespace corresponding to a first tenant in the customer account, the first tenant including (e.g., being) a first customer of the first business entity; and the customer account further includes a second namespace corresponding to a second tenant in the customer account, the second tenant including (e.g., being) a second customer of the first business entity.

Example 31 is a method that includes authenticating, by a database platform that includes at least one hardware processor, a system user for access via an application to a database associated with a customer account of the database platform, the system user being a first object in a first account-level namespace of the customer account, the first account-level namespace being distinct from a default account-level namespace of the customer account; sending, by the system user via the application, a query to the database that is associated in the database platform with the customer account; receiving, as the system user, results of the query from the database; and storing, as the system user, the results of the query in a first-namespace stage, the first-namespace stage being a second object in the first account-level namespace.

Example 32 is the method of Example 31, where authenticating the system user for access via the application to the database includes providing credentials for the system user from the application to the database platform.

Example 33 is the method of either Example 31 or Example 32, where objects in the first account-level namespace are not visible to objects in the default account-level namespace.

Example 34 is the method of any of the Examples 31-33, further including conducting, as the system user, a database session with respect to the database, the conducting of the database session including conducting one or more database transactions on the database, the conducting of the one or more database transactions on the database including the sending of the query to the database.

Example 35 is the method of Example 34, where the database session is bound to the system user and to the first account-level namespace.

Example 36 is the method of any of the Examples 31-35, further including detecting that a first user in the customer account has performed a second query and received second-query results, the first user being an object in the default account-level namespace; connecting as the system user to the database platform to open a database session; downloading the second-query results from the database; and storing the second-query results in the first-namespace stage.

Example 37 is the method of Example 36, further including providing access to the second-query results to one or more users via a user interface of the application.

Example 38 is the method of any of the Examples 31-37, further including providing access to the results of the query to one or more users via a user interface of the application.

Example 39 is the method of any of the Examples 31-38, further including modifying, as the system user, one or more objects in the first account-level namespace.

Example 40 is the method of any of the Examples 31-39, where the system user has granted thereto an administrative role for the application, the administrative role for the application not being owned by an administrative role for the customer account.

Example 41 is a database platform that includes at least one hardware processor; and one or more computer-storage media containing instructions executable by the at least one hardware processor for causing the at least one hardware processor to perform operations including authenticating a system user for access via an application to a database associated with a customer account of the database platform, the system user being a first object in a first account-level namespace of the customer account, the first account-level namespace being distinct from a default account-level namespace of the customer account; sending, by the system user via the application, a query to the database that is associated in the database platform with the customer account; receiving, as the system user, results of the query from the database; and storing, as the system user, the results of the query in a first-namespace stage, the first-namespace stage being a second object in the first account-level namespace.

Example 42 is the database platform of Example 41, where authenticating the system user for access via the application to the database includes providing credentials for the system user from the application to the database platform.

Example 43 is the database platform of either Example 41 or Example 42, where objects in the first account-level namespace are not visible to objects in the default account-level namespace.

Example 44 is the database platform of any of the Examples 41-43, the operations further including conducting, as the system user, a database session with respect to the database, the conducting of the database session including conducting one or more database transactions on the database, the conducting of the one or more database transactions on the database including the sending of the query to the database.

Example 45 is the database platform of Example 44, where the database session is bound to the system user and to the first account-level namespace.

Example 46 is the database platform of any of the Examples 41-45, the operations further including detecting that a first user in the customer account has performed a second query and received second-query results, the first user being an object in the default account-level namespace; connecting as the system user to the database platform to open a database session; downloading the second-query results from the database; and storing the second-query results in the first-namespace stage.

Example 47 is the database platform of Example 46, the operations further including providing access to the second-query results to one or more users via a user interface of the application.

Example 48 is the database platform of any of the Examples 41-47, the operations further including providing access to the results of the query to one or more users via a user interface of the application.

Example 49 is the database platform of any of the Examples 41-48, the operations further including modifying, as the system user, one or more objects in the first account-level namespace.

Example 50 is the database platform of any of the Examples 41-49, where the system user has granted thereto an administrative role for the application, the administrative role for the application not being owned by an administrative role for the customer account.

Example 51 is one or more computer-storage media containing instructions executable by at least one hardware processor for causing the at least one hardware processor to perform operations including authenticating a system user for access via an application to a database associated with a customer account of a database platform, the system user being a first object in a first account-level namespace of the customer account, the first account-level namespace being distinct from a default account-level namespace of the customer account; sending, by the system user via the application, a query to the database that is associated in the database platform with the customer account; receiving, as the system user, results of the query from the database; and storing, as the system user, the results of the query in a first-namespace stage, the first-namespace stage being a second object in the first account-level namespace.

Example 52 is the one or more computer-storage media of Example 51, where authenticating the system user for access via the application to the database includes providing credentials for the system user from the application to the database platform.

Example 53 is the one or more computer-storage media of either Example 51 or Example 52, where objects in the first account-level namespace are not visible to objects in the default account-level namespace.

Example 54 is the one or more computer-storage media of any of the Examples 51-53, the operations further including conducting, as the system user, a database session with respect to the database, the conducting of the database session including conducting one or more database transactions on the database, the conducting of the one or more database transactions on the database including the sending of the query to the database.

Example 55 is the one or more computer-storage media of Example 54, where the database session is bound to the system user and to the first account-level namespace.

Example 56 is the one or more computer-storage media of any of the Examples 51-55, the operations further including detecting that a first user in the customer account has performed a second query and received second-query results, the first user being an object in the default account-level namespace; connecting as the system user to the database platform to open a database session; downloading the second-query results from the database; and storing the second-query results in the first-namespace stage.

Example 57 is the one or more computer-storage media of Example 56, the operations further including providing access to the second-query results to one or more users via a user interface of the application.

Example 58 is the one or more computer-storage media of any of the Examples 51-57, the operations further including providing access to the results of the query to one or more users via a user interface of the application.

Example 59 is the one or more computer-storage media of any of the Examples 51-58, the operations further including modifying, as the system user, one or more objects in the first account-level namespace.

Example 60 is the one or more computer-storage media of any of the Examples 51-59, where the system user has granted thereto an administrative role for the application, the administrative role for the application not being owned by an administrative role for the customer account.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included In at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method performed by a database platform executing instructions on at lea stone hardware processor, the method comprising:

storing a plurality of objects across a plurality of disjoint account-level namespaces in a customer account from among a plurality of customer accounts of a database platform, each customer account among the plurality of customer accounts being associated with a different customer of the database platform, each object among the plurality of objects having a corresponding first object name, each object among the plurality of objects being uniquely identifiable within a current account-level namespace of a given database session by the corresponding first object name of a object, each object among the plurality of objects being uniquely identifiable both within and outside of the current account-level namespace of the given database session by a combination of a corresponding account-level namespace in which the corresponding object resides and the corresponding first object name of the corresponding object, the plurality of disjoint account-level namespaces including an application account-level namespace and a default account-level namespace, each of the plurality of disjoint account-level namespaces comprises a distinct context for resolution of object identifiers such that matching object identifiers in different account-level namespaces in the plurality of disjoint account-level namespaces in the customer account map to different objects and do not collide with respect to object-identifier resolution, the storing of the plurality of objects comprising storing a first portion of the plurality of objects associated with the application account-level namespace while disabling visibility of the first portion of the plurality of objects associated with the application account-level namespace to a plurality of users defined in the default account-level namespace;

receiving, by a provisioning framework system of the database platform, a provisioning request from a client, the provisioning request:
- received over a first network path, not including any of a second network path, by a default namespace object previously provisioned for communications with the client over the first network path,
- specifying an application hosted by a third party; and
- requesting provisioning of an application specific namespace object of the customer account on the database platform, the application specific namespace object configured to provide communications between the application and the database platform over the second network path not including any of the first network path;

in response to receiving the provisioning request, retrieving an application-provisioning file specific to the application, the application-provisioning file being created by the third party, the application-provisioning file including one or more database objects comprising at least:
- an application identifier;
- a namespace identifier; and
- one or more provisioning statements;

executing the application-provisioning file causing:
- creating of the application namespace in accordance with the namespace identifier, the application namespace being separate from the default namespace object of the customer account;
- creating at least one of the one or more database objects included in the application-provisioning file, the created database objects including the plurality of users and associated user roles;
- assigning the application namespace and the application identifier to each of the created database objects to prevent name collisions by allowing the platform to distinguish between the provisioned database objects,
- assigning each of the users to one or more user roles such that each user is assigned to one or more security privileges associated with each assigned role, the security privileges enabling the associated user to perform one or more operations in the application;

subsequent to the execution of the application-provisioning file:
- receiving, by the database platform, a data request for customer data from the application triggered by the requesting entity;
- routing the data request to the application specific namespace object using the application over the second network path;
- receiving, by the application specific namespace object, the customer data; and
- providing, by the application specific namespace object, the received customer data to the application over the second network path.

2. The method of claim 1, wherein each account-level namespace in the plurality of disjoint account-level namespaces provides rules-based access control that is applied by the database platform to any one or more objects in the account-level namespace, the rules-based access control comprising selectively assignable privileges for access control of one or more users to the account-level namespace and any one or more objects therein.

3. The method of claim 1, wherein the first object and the second object are different account-level objects in the customer account.

4. The method of claim 3, wherein:
the second object comprises a database object that is associated with a database in the customer account;
receiving the second object identifier comprises receiving a query directed to the database, the query comprising the second object identifier;
the identifying of the second object corresponding to the second object identifier in the customer account comprises identifying the database object; and
the method further comprises processing the query with respect to the associated database.

5. The method of claim 1, further comprising:
receiving, from the client in association with the database session, a set-current-namespace command to set a namespace specified in the set-current-namespace command as the current account-level namespace of the database session; and
setting, in response to receiving the set-current-namespace command, the specified namespace as the current account-level namespace of the database session.

6. The method of claim 1, wherein a namespace object in the customer account represents the current account-level namespace of the database session.

7. The method of claim 6, wherein:
the namespace object comprises a namespace identifier; and
the current account-level namespace of the database session contains one or more objects, each such object having a namespace-identifier property set equal to the namespace identifier.

8. The method of claim 1, wherein:
the plurality of account-level namespaces comprises a first account-level namespace;
the first account-level namespace contains one or more objects; and
the method further comprises:
receiving a replication request to replicate the first account-level namespace; and
in response to receiving the replication request, replicating the first account-level namespace, the replicating of the first account-level namespace comprising creating a second account-level namespace, the second account-level namespace comprising copies of the one or more objects.

9. The method of claim 1, wherein:
the customer account is associated with a first business entity;
the plurality of account-level namespaces comprises a first account-level namespace corresponding to a first tenant in the customer account, the first tenant comprising a first customer of the first business entity; and the plurality of account-level namespaces further comprises a second account-level namespace corresponding to a second tenant in the customer account, the second tenant comprising a second customer of the first business entity.

10. A database platform comprising:
at least one hardware processor; and
one or more computer-storage media containing instructions that, when executed by at least one hardware processor, cause the at least one hardware processor to perform operations comprising:
storing a plurality of objects across a plurality of disjoint account-level namespaces in a customer account from among a plurality of customer accounts of a database platform, each customer account among the plurality of customer accounts being associated with a different customer of the database platform, each object among the plurality of objects having a corresponding first object name, each object among the plurality of objects being uniquely identifiable within a current account-level namespace of a given database session by the corresponding first object name of a object, each object among the plurality of objects being uniquely identifiable both within and outside of the current account-level namespace of the given database session by a combination of a corresponding account-level namespace in which the corresponding object resides and the corresponding first object name of the corresponding object,
the plurality of disjoint account-level namespaces including an application account-level namespace and a default account-level namespace, each of the plurality of disjoint account-level namespaces comprises a distinct context for resolution of object identifiers such that matching object identifiers in different account-level namespaces in the plurality of disjoint account-level namespaces in the customer account map to different objects and do not collide with respect to object-identifier resolution, the storing of the plurality of objects comprising storing a first portion of the plurality of objects associated with the application account-level namespace while disabling visibility of the first portion of the plurality of objects associated with the application account-level namespace to a plurality of users defined in the default account-level namespace;
receiving, by a provisioning framework system of the database platform, a provisioning request from a client, the provisioning request:
received over a first network path, not including any of a second network path, by a default namespace object previously provisioned for communications with the client over the first network path,
specifying an application hosted by a third party; and
requesting provisioning of an application specific namespace object of the customer account on the database platform, the application specific namespace object configured to provide communications between the application and the database platform over the second network path not including any of the first network path;
in response to receiving the provisioning request, retrieving an application-provisioning file specific to the application, the application-provisioning file being created by the third party, the application-provisioning file including one or more database objects comprising at least:
an application identifier;
a namespace identifier; and
one or more provisioning statements;
executing the application-provisioning file causing:
creating of the application namespace in accordance with the namespace identifier, the application namespace being separate from the default namespace object of the customer account;
creating at least one of the one or more database objects included in the application-provisioning file, the created database objects including the plurality of users and associated user roles;
assigning the application namespace and the application identifier to each of the created database objects to prevent name collisions by allowing the platform to distinguish between the provisioned database objects,
assigning each of the users to one or more user roles such that each user is assigned to one or more security privileges associated with each assigned role, the security privileges enabling the associated user to perform one or more operations in the application;
subsequent to the execution of the application-provisioning file:
receiving, by the database platform, a data request for customer data from the application triggered by the requesting entity;
routing the data request to the application specific namespace object using the application over the second network path;
receiving, by the application specific namespace object, the customer data; and
providing, by the application specific namespace object, the received customer data to the application over the second network path.

11. The database platform of claim 10, wherein each account-level namespace in the plurality of disjoint account-level namespaces provides rules-based access control that is applied by the database platform to any one or more objects in the account-level namespace, the rules-based access control comprising selectively assignable privileges for access control of one or more users to the account-level namespace and any one or more objects therein.

12. The database platform of claim 10, wherein the first object and the second object are different account-level objects in the customer account.

13. The database platform of claim 12, wherein:
the second object comprises a database object that is associated with a database in the customer account;
receiving the second object identifier comprises receiving a query directed to the database, the query comprising the second object identifier;
the identifying of the second object corresponding to the second object identifier in the customer account comprises identifying the database object; and
the operations further comprise processing the query with respect to the associated database.

14. The database platform of claim 10, the operations further comprising:
receiving, from the client in association with the database session, a set-current-namespace command to set a namespace specified in the set-current-namespace command as the current account-level namespace of the database session; and setting, in response to receiving the set-current-namespace command, the specified namespace as the current account-level namespace of the database session.

15. The database platform of claim 10, wherein a namespace object in the customer account represents the current account-level namespace of the database session.

16. The database platform of claim 15, wherein:
the namespace object comprises a namespace identifier; and
the current account-level namespace of the database session contains one or more objects, each such object having a namespace-identifier property set equal to the namespace identifier.

17. The database platform of claim 10, wherein:
the plurality of account-level namespaces comprises a first account-level namespace;
the first account-level namespace contains one or more objects; and
the operations further comprise:
receiving a replication request to replicate the first account-level namespace; and
in response to receiving the replication request, replicating the first account-level namespace, the replicating of the first account-level namespace creating a second account-level namespace, the second account-level namespace comprising copies of the one or more objects.

18. The database platform of claim 10, wherein:
the customer account is associated with a first business entity;
the plurality of account-level namespaces comprises a first account-level namespace corresponding to a first tenant in the customer account, the first tenant comprising a first customer of the first business entity; and
the plurality of account-level namespaces further comprises a second account-level namespace corresponding to a second tenant in the customer account, the second tenant comprising a second customer of the first business entity.

19. One or more non-transient computer-storage media containing instructions that, when executed by at lea st one hardware processor of a database platform, cause the at least one hardware processor to perform operations comprising:
storing a plurality of objects across a plurality of disjoint account-level namespaces in a customer account from among a plurality of customer accounts of a database platform, each customer account among the plurality of customer accounts being associated with a different customer of the database platform, each object among the plurality of objects having a corresponding first object name, each object among the plurality of objects being uniquely identifiable within a current account-level namespace of a given database session by the corresponding first object name of a object, each object among the plurality of objects being uniquely identifiable both within and outside of the current account-level namespace of the given database session by a combination of a corresponding account-level namespace in which the corresponding object resides and the corresponding first object name of the corresponding object,
the plurality of disjoint account-level namespaces including an application account-level namespace and a default account-level namespace, each of the plurality of disjoint account-level namespaces comprises a distinct context for resolution of object identifiers such that matching object identifiers in different account-level namespaces in the plurality of disjoint account-level namespaces in the customer account map to different objects and do not collide with respect to object-identifier resolution, the storing of the plurality of objects comprising storing a first portion of the plurality of objects associated with the application account-level namespace while disabling visibility of the first portion of the plurality of objects associated with the application account-level namespace to a plurality of users defined in the default account-level namespace;

receiving, by a provisioning framework system of the database platform, a provisioning request from a client, the provisioning request:
received over a first network path, not including any of a second network path, by a default namespace object previously provisioned for communications with the client over the first network path,
specifying an application hosted by a third party; and
requesting provisioning of an application specific namespace object of the customer account on the database platform, the application specific namespace object configured to provide communications between the application and the database platform over the second network path not including any of the first network path, in response to receiving the provisioning request, retrieving an application-provisioning file specific to the application, the application-provisioning file being created by the third party, the application-provisioning file including one or more database objects comprising at least:
an application identifier;
a namespace identifier; and
one or more provisioning statements executing the application-provisioning file causing:
creating of the application namespace in accordance with the namespace identifier, the application namespace being separate from the default namespace object of the customer account;
creating at least one of the one or more database objects included in the application-provisioning file, the created database objects including the plurality of users and associated user roles;
assigning the application namespace and the application identifier to each of the created database objects to prevent name collisions by allowing the platform to distinguish between the provisioned database objects,
assigning each of the users to one or more user roles such that each user is assigned to one or more security privileges associated with each assigned role, the security privileges enabling the associated user to perform one or more operations in the application:

subsequent to the execution of the application-provisioning file:
receiving, by the database platform, a data request for customer data from the application triggered by the requesting entity;

routing the data request to the application specific namespace object using the application over the second network path;

receiving, by the application specific namespace object, the customer data; and providing, by the application specific namespace object, the received customer data to the application over the second network path.

20. The one or more computer-storage media of claim 19, wherein each account-level namespace in the plurality of disjoint account-level namespaces provides rules-based access control that is applied by the database platform to any one or more objects in the account-level namespace, the rules-based access control comprising selectively assignable privileges for access control of one or more users to the account-level namespace and any one or more objects therein.

21. The one or more computer-storage media of claim 19, wherein the first object and the second object are different account-level objects in the customer account.

22. The one or more computer-storage media of claim 21, wherein:

the second object comprises a database object that is associated with a database in the customer account;

receiving the second object identifier comprises receiving a query directed to the database, the query comprising the second object identifier;

the identifying of the second object corresponding to the second object identifier in the customer account comprises identifying the database object; and the operations further comprise processing the query with respect to the associated database.

23. The method of claim 1, further comprising storing an application object defining an application of the database platform, the application configured to resolve object identifiers with reference to the disjoint account-level namespaces, the application object being visible to objects associated with both the application account-level namespace and the default account-level namespace.

* * * * *

UNITED STATES PATENT AND TRADEMARK OFFICE
CERTIFICATE OF CORRECTION

PATENT NO. : 11,971,876 B2  
APPLICATION NO. : 17/647915  
DATED : April 30, 2024  
INVENTOR(S) : Carru et al.

Page 1 of 1

It is certified that error appears in the above-identified patent and that said Letters Patent is hereby corrected as shown below:

In the Claims

In Column 30, Line 44, in Claim 1, delete "lea stone" and insert --least one-- therefor In Column 33, Line 10, in Claim 10, delete "lea st" and insert --least-- therefor In Column 35, Line 42, in Claim 19, delete "lea st" and insert --least-- therefor In Column 36, Line 29, in Claim 19, delete "path," and insert --path;-- therefor In Column 36, Line 40, in Claim 19, after "statements", insert --;¶--

Signed and Sealed this  
Twelfth Day of August, 2025

Coke Morgan Stewart  
*Acting Director of the United States Patent and Trademark Office*